(12) United States Patent
Niell et al.

(10) Patent No.: US 10,534,935 B2
(45) Date of Patent: Jan. 14, 2020

(54) MIGRATION OF TRUSTED SECURITY ATTRIBUTES TO A SECURITY ENGINE CO-PROCESSOR

(71) Applicant: Intel Corporation, Santa Clara, CA (US)

(72) Inventors: Jose S. Niell, Franklin, MA (US); Gautham N. Chinya, Hillsboro, OR (US); Khee Wooi Lee, Bayan Lepas (MY); William A. Stevens, Jr., Folsom, CA (US); Josh Triplett, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 470 days.

(21) Appl. No.: 15/200,935

(22) Filed: Jul. 1, 2016

(65) Prior Publication Data
US 2018/0004979 A1 Jan. 4, 2018

(51) Int. Cl.
*G06F 21/70* (2013.01)
(52) U.S. Cl.
CPC .................................. *G06F 21/70* (2013.01)
(58) Field of Classification Search
CPC ....................................................... G06F 21/70
USPC .......................................................... 726/21
See application file for complete search history.

(56) References Cited

U.S. PATENT DOCUMENTS

| 7,065,654 B1 | 6/2006 | Gulick et al. |
| 8,171,309 B1 | 5/2012 | Poo et al. |
| 2008/0028234 A1 | 1/2008 | Ducharme |
| 2009/0138623 A1* | 5/2009 | Bosch ..................... G06F 21/74 710/14 |
| 2012/0137119 A1* | 5/2012 | Doerr ..................... G06F 15/167 713/100 |
| 2012/0331308 A1* | 12/2012 | Fernandez Gutierrez .................... G06F 21/71 713/190 |

(Continued)

FOREIGN PATENT DOCUMENTS

WO 2015113046 A1 7/2015

OTHER PUBLICATIONS

International Search Report and Written Opinion issued in PCT Application No. PCT/US2017/035174 dated Sep. 12, 2017; 10 pages.

(Continued)

*Primary Examiner* — Peter C Shaw
(74) *Attorney, Agent, or Firm* — Alliance IP, LLC

(57) ABSTRACT

A system-on-chip (SoC) includes a host CPU on a CPU fabric, the host CPU including multiple processor cores, each associated with multiple security attributes. The SoC includes a secure asset on a network-on-chip and a security co-processor. The security co-processor includes circuitry to detect requests from the processor cores targeting the secure asset and security function processing requests, to determine, based on associated security attributes, whether the core or function is authorized to access the secure asset, to allow the request to be issued, if the core or function is so authorized, and to prevent its issuance, if not. The determination may be dependent on a signal from the CPU fabric indicating whether the host CPU can modify its security attributes or they are locked down. The security co-processor may have the highest security level and may be the only master on the SoC that can access the secure asset.

13 Claims, 28 Drawing Sheets

(56) References Cited

U.S. PATENT DOCUMENTS

| | | | |
|---|---|---|---|
| 2014/0331019 A1* | 11/2014 | Parker | G06F 12/1458 |
| | | | 711/163 |
| 2015/0039891 A1* | 2/2015 | Ignatchenko | G06F 21/575 |
| | | | 713/171 |
| 2015/0067355 A1 | 3/2015 | Hall | |
| 2015/0113046 A1 | 4/2015 | Rosberg | |
| 2016/0034397 A1* | 2/2016 | Lam | G06F 12/0842 |
| | | | 711/119 |

OTHER PUBLICATIONS

Intel Corporation, IA-32 Intel® Architecture Software Developer's Manual—vol. 2: Instruction Set Reference, 978 pages, 2003.
International Preliminary Report on Paentability issued in PCT Application No. PCT/US2017/035174, dated Jan. 1, 2019, 8 pages.

* cited by examiner

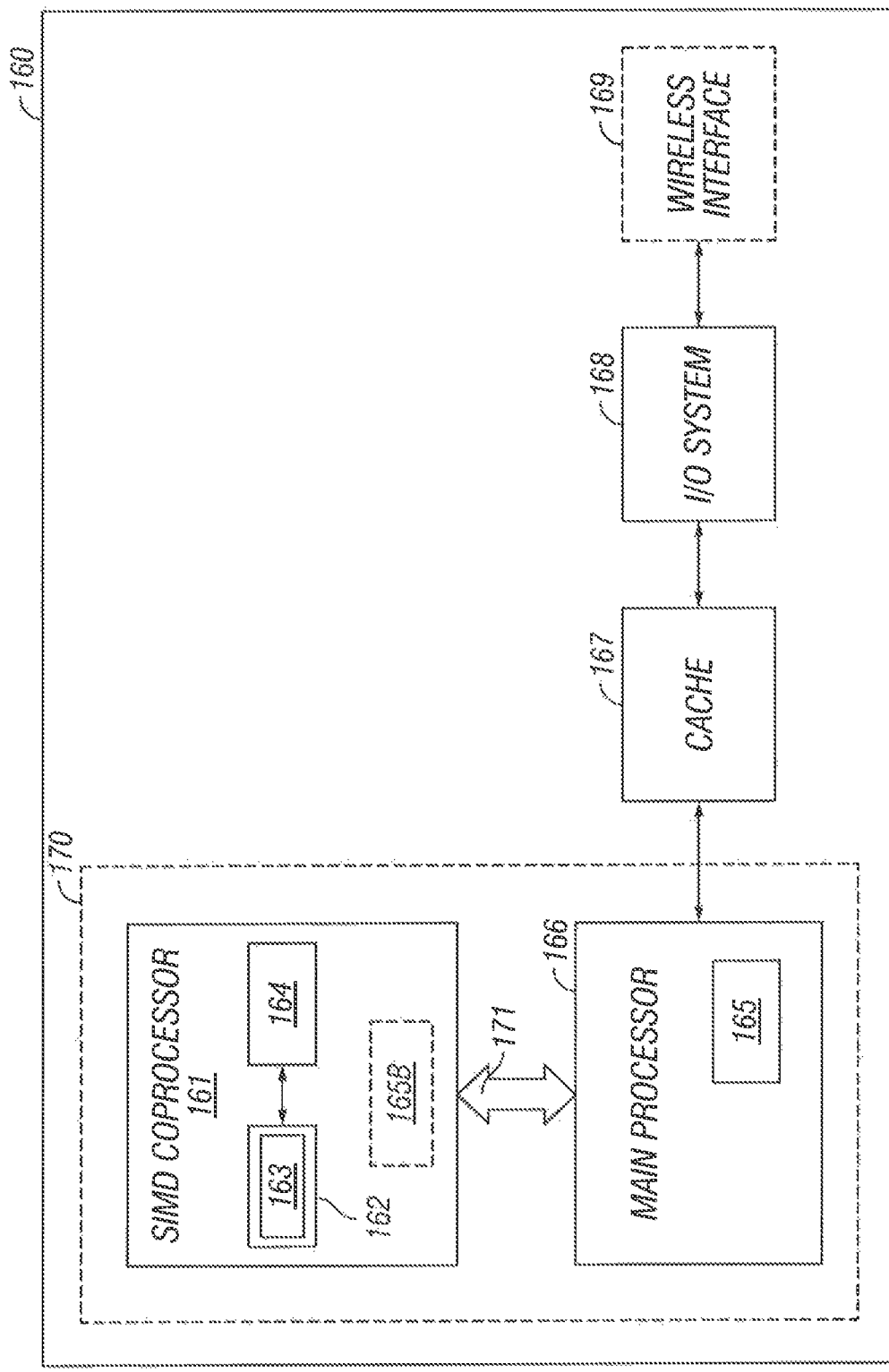

Packed Half (341)

| 127 112 111 | 96 95 | 80 79 | 64 63 | 48 47 | 32 31 | 16 15 | 0 |
|---|---|---|---|---|---|---|---|
| HALF 7 | HALF 6 | HALF 5 | HALF 4 | HALF 3 | HALF 2 | HALF 1 | HALF 0 |

Packed Single (342)

| 127 | 96 95 | 64 63 | 32 31 | 0 |
|---|---|---|---|---|
| SINGLE 3 | SINGLE 2 | SINGLE 1 | SINGLE 0 |

Packed Double (343)

| 127 | 64 63 | 0 |
|---|---|---|
| DOUBLE 1 | DOUBLE 0 |

FIG. 3B

| 127 | 120 119 | 112 111 | 104 103 | | | | 24 23 | 16 15 | 8 7 | 0 |
|---|---|---|---|---|---|---|---|---|---|---|
| bbbb bbbb | bbbb bbbb | bbbb bbbb | | * | * | * | bbbb bbbb | bbbb bbbb | bbbb bbbb | |

UNSIGNED PACKED BYTE REPRESENTATION 344

| 127 | 120 119 | 112 111 | 104 103 | | | | 24 23 | 16 15 | 8 7 | 0 |
|---|---|---|---|---|---|---|---|---|---|---|
| sbbb bbbb | sbbb bbbb | sbbb bbbb | | * | * | * | sbbb bbbb | sbbb bbbb | sbbb bbbb | |

SIGNED PACKED BYTE REPRESENTATION 345

| 127 | 112 111 | | | | 16 15 | 0 |
|---|---|---|---|---|---|---|
| wwww wwww wwww wwww | | * | * | * | wwww wwww wwww wwww | |

UNSIGNED PACKED WORD REPRESENTATION 346

| 127 | 112 111 | | | | 16 15 | 0 |
|---|---|---|---|---|---|---|
| swww wwww wwww wwww | | * | * | * | swww wwww wwww wwww | |

SIGNED PACKED WORD REPRESENTATION 347

| 127 | | 92 91 | 32 31 | | 0 |
|---|---|---|---|---|---|
| dddd dddd dddd dddd dddd dddd dddd dddd | | * * * | dddd dddd dddd dddd dddd dddd dddd dddd | | |

UNSIGNED PACKED DOUBLEWORD REPRESENTATION 348

| 127 | | 92 91 | 32 31 | | 0 |
|---|---|---|---|---|---|
| sddd dddd dddd dddd dddd dddd dddd dddd | | * * * | sddd dddd dddd dddd dddd dddd dddd dddd | | |

SIGNED PACKED DOUBLEWORD REPRESENTATION 349

MIGRATION OF TRUSTED SECURITY ATTRIBUTES TO A SECURITY ENGINE CO-PROCESSOR

FIELD OF THE INVENTION

The present disclosure pertains to the field of processing logic, microprocessors, and associated instruction set architectures that, when executed by the processor or other processing logic, perform logical, mathematical, or other functional operations.

DESCRIPTION OF RELATED ART

Multiprocessor systems are becoming more and more common. Applications of multiprocessor systems include dynamic domain partitioning all the way down to desktop computing. In order to take advantage of multiprocessor systems, code to be executed may be separated into multiple threads for execution by various processing entities. Each thread may be executed in parallel with one another. Pipelining of applications may be implemented in systems in order to more efficiently execute applications. Instructions as they are received on a processor may be decoded into terms or instruction words that are native, or more native, for execution on the processor. Processors may be implemented in a system on chip (SoC). An SoC may include sensitive information or secure assets, accesses to which are intended to be restricted.

DESCRIPTION OF THE FIGURES

Embodiments are illustrated by way of example and not limitation in the Figures of the accompanying drawings:

FIG. 1C illustrates other embodiments of a data processing system for performing text string comparison operations;

FIG. 3B illustrates possible in-register data storage formats, in accordance with embodiments of the present disclosure;

FIG. 3C illustrates various signed and unsigned packed data type representations in multimedia registers, in accordance with embodiments of the present disclosure;

FIG. 3D illustrates an embodiment of an operation encoding format;

FIG. 3E illustrates another possible operation encoding format having forty or more bits, in accordance with embodiments of the present disclosure;

FIG. 3F illustrates yet another possible operation encoding format, in accordance with embodiments of the present disclosure;

DETAILED DESCRIPTION

Figure 1A:
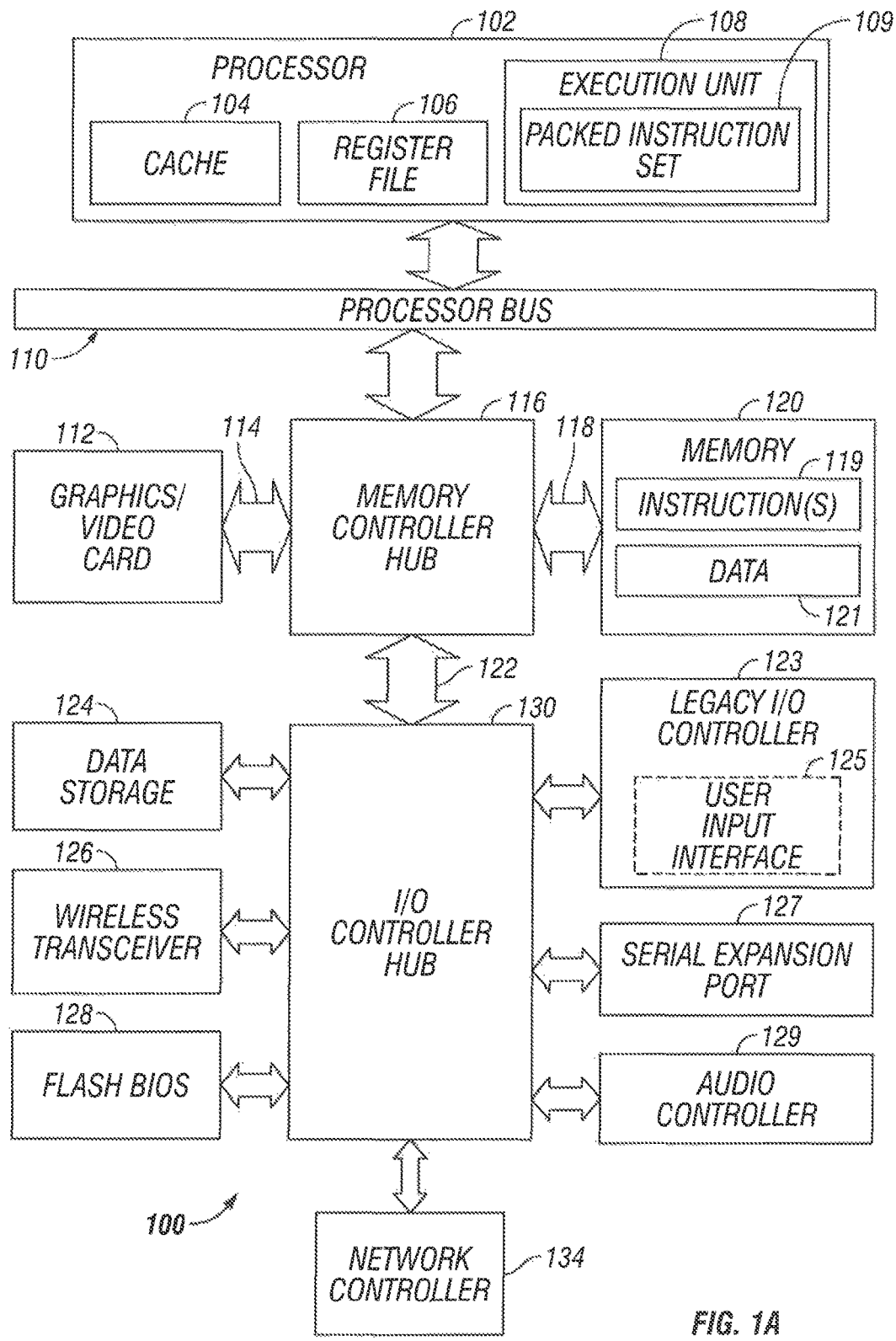
FIG. 1A is a block diagram of an exemplary computer system formed with a processor that may include execution units to execute an instruction, in accordance with embodiments of the present disclosure.

The following description describes a processing apparatus and processing logic for migrating trusted security attributes from a host CPU in an SoC architecture to a security engine co-processor. Such a processing apparatus may include an out-of-order processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel®

Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions 119 and/or data 121 represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for storage of instructions 119 and data 121 and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller 129, firmware hub (flash BIOS) 128, wireless transceiver 126, data storage 124, legacy I/O controller 123 containing user input interface 125 (which may include a keyboard interface), a serial expansion port 127 such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
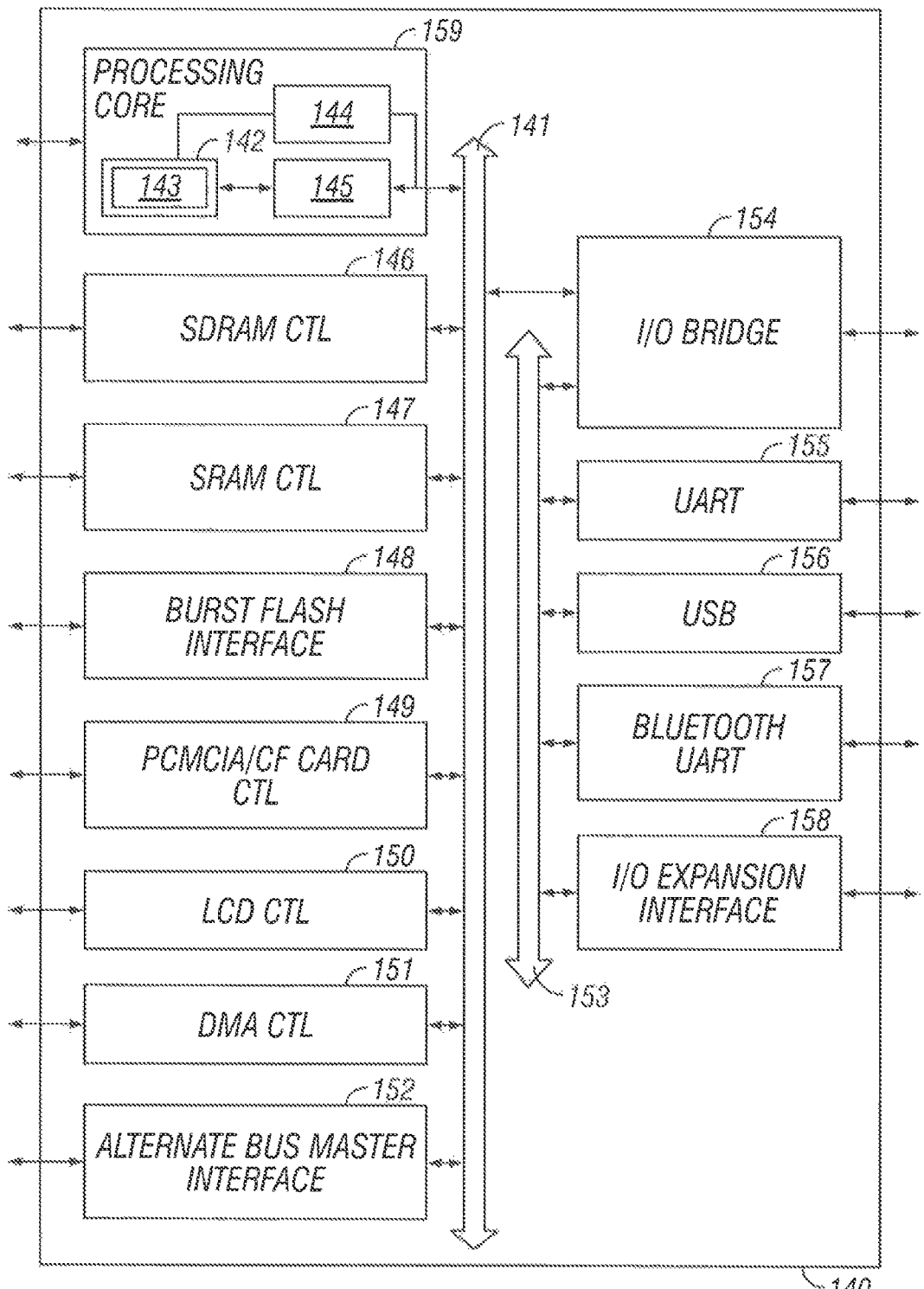
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165 to recognize instructions of instruction set 163 including instructions in accordance with one embodiment for execution by execution unit 162. In other embodiments, SIMD coprocessor 161 also comprises at least part of decoder 165 (shown as 165B) to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 171. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
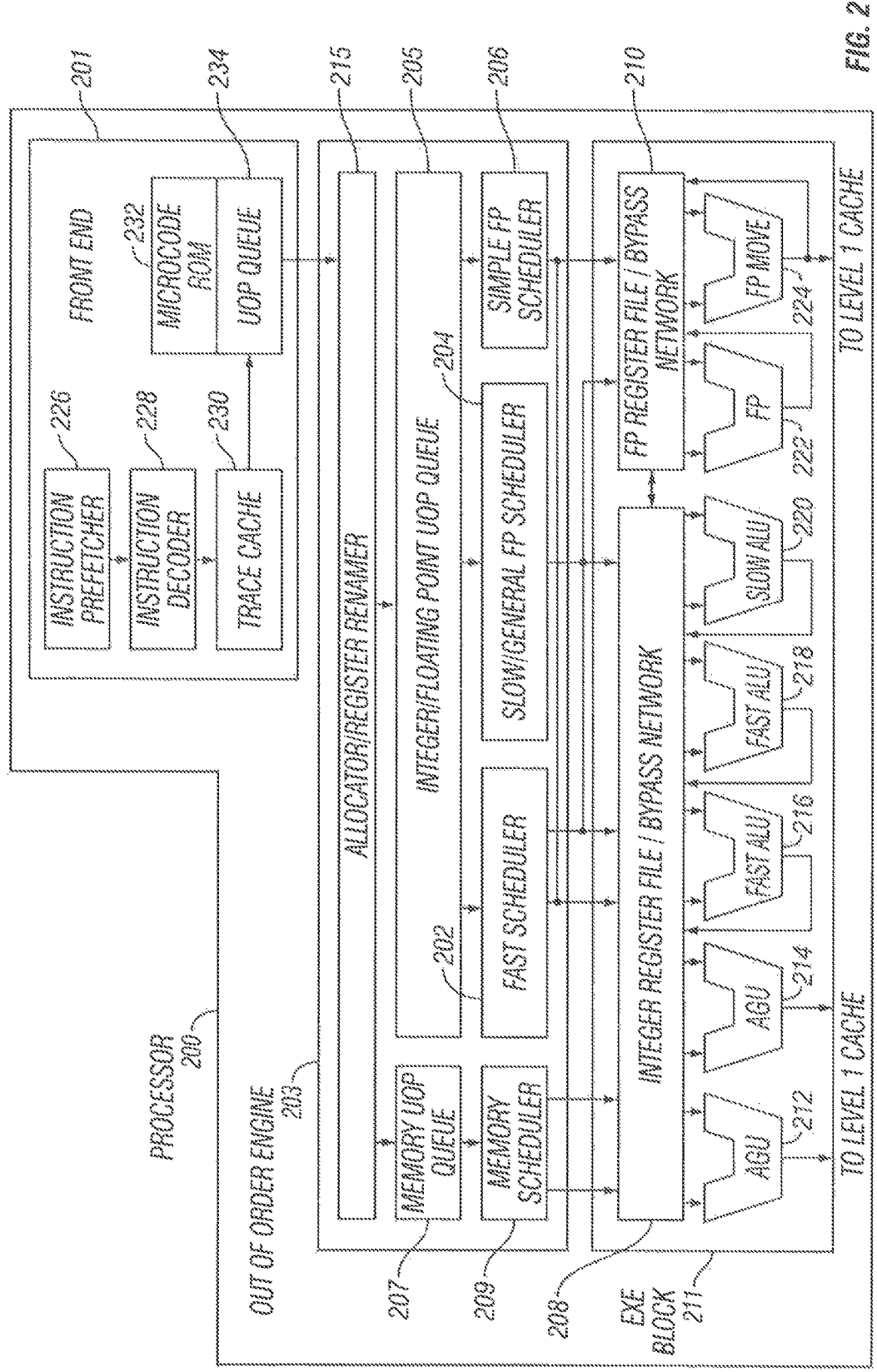
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic in allocator/register renamer 215 allocates the machine buffers and resources that each uop needs in order to execute. The register renaming logic in allocator/register renamer 215 renames logic registers onto entries in a register file. The allocator 215 also allocates an entry for each uop in one of the two uop queues, one for memory operations (memory uop queue 207) and one for non-memory operations (integer/floating point uop queue 205), in front of the instruction schedulers: memory scheduler 209, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast ALU 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX' registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point data may be contained in the same register file or different register files. Furthermore, in one embodiment, floating point and integer data may be stored in different registers or the same registers.

Figure 3A:
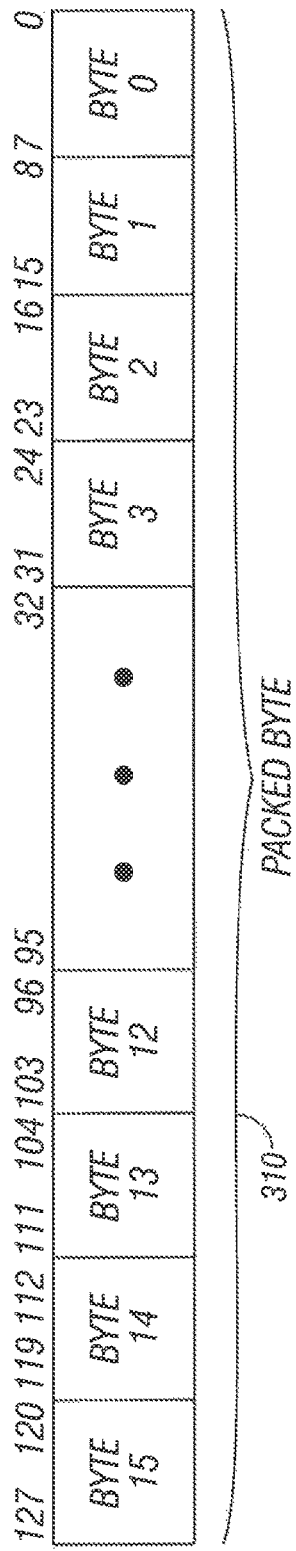
FIG. 3A illustrates various packed data type representations in multimedia registers, in accordance with embodiments of the present disclosure.
Figure 3A:
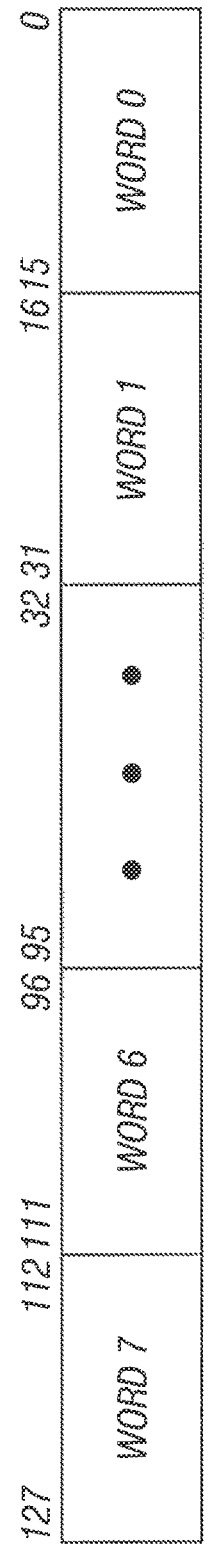
Figure 3A:
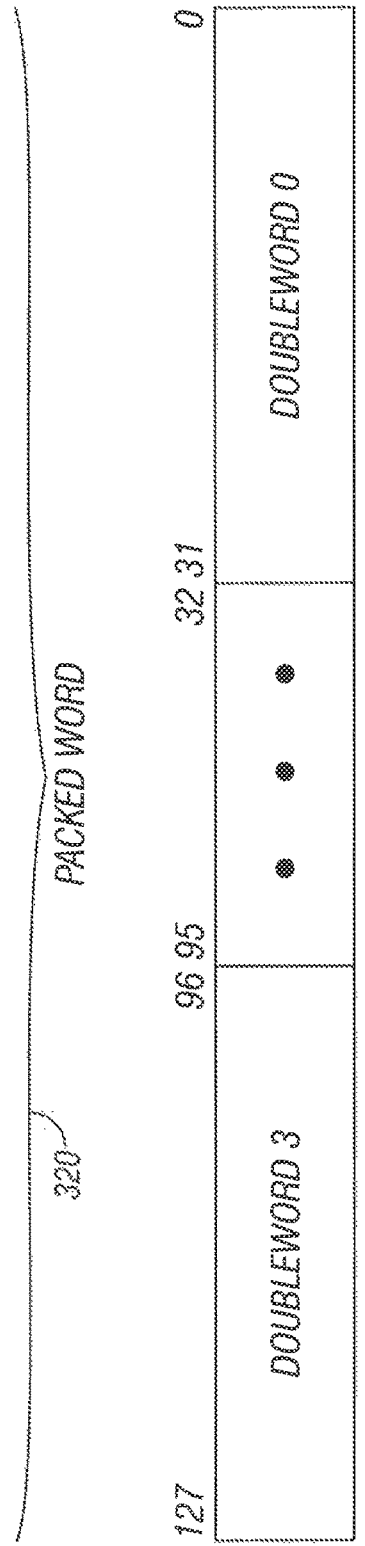

In the examples of the following figures, a number of data operands may be described. FIG. 3A illustrates various packed data type representations in multimedia registers, in accordance with embodiments of the present disclosure. FIG. 3A illustrates data types for a packed byte 310, a packed word 320, and a packed doubleword (dword) 330 for 128-bit wide operands. Packed byte format 310 of this example may be 128 bits long and contains sixteen packed byte data elements. A byte may be defined, for example, as eight bits of data. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement increases the storage efficiency of the processor. As well, with sixteen data elements accessed, one operation may now be performed on sixteen data elements in parallel.

Generally, a data element may include an individual piece of data that is stored in a single register or memory location with other data elements of the same length. In packed data sequences relating to SSEx technology, the number of data elements stored in a XMM register may be 128 bits divided by the length in bits of an individual data element. Similarly, in packed data sequences relating to MMX and SSE technology, the number of data elements stored in an MMX register may be 64 bits divided by the length in bits of an individual data element. Although the data types illustrated in FIG. 3A may be 128 bits long, embodiments of the present disclosure may also operate with 64-bit wide or other sized operands. Packed word format 320 of this example may be 128 bits long and contains eight packed word data elements. Each packed word contains sixteen bits of information. Packed doubleword format 330 of FIG. 3A may be 128 bits long and contains four packed doubleword data elements. Each packed doubleword data element contains thirty-two bits of information. A packed quadword may be 128 bits long and contain two packed quad-word data elements.

FIG. 3B illustrates possible in-register data storage formats, in accordance with embodiments of the present disclosure. Each packed data may include more than one independent data element. Three packed data formats are illustrated; packed half 341, packed single 342, and packed double 343. One embodiment of packed half 341, packed single 342, and packed double 343 contain fixed-point data elements. For another embodiment one or more of packed half 341, packed single 342, and packed double 343 may contain floating-point data elements. One embodiment of packed half 341 may be 128 bits long containing eight 16-bit data elements. One embodiment of packed single 342 may be 128 bits long and contains four 32-bit data elements. One embodiment of packed double 343 may be 128 bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers, in accordance with embodiments of the present disclosure. Unsigned packed byte representation 344 illustrates the storage of an unsigned packed byte in a SIMD register. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement may increase the storage efficiency of the processor. As well, with sixteen data elements accessed, one operation may now be performed on sixteen data elements in a parallel fashion. Signed packed byte representation 345 illustrates the storage of a signed packed byte. Note that the eighth bit of every byte data element may be the sign indicator. Unsigned packed word representation 346 illustrates how word seven through word zero may be stored in a SIMD register. Signed packed word representation 347 may be similar to the unsigned packed word in-register representation 346. Note that the sixteenth bit of each word data element may be the sign indicator. Unsigned packed doubleword representation 348 shows how doubleword data elements are stored. Signed packed doubleword representation 349 may be similar to unsigned packed doubleword in-register representation 348. Note that the necessary sign bit may be the thirty-second bit of each doubleword data element.

Figures 3D, 3E, 3F:
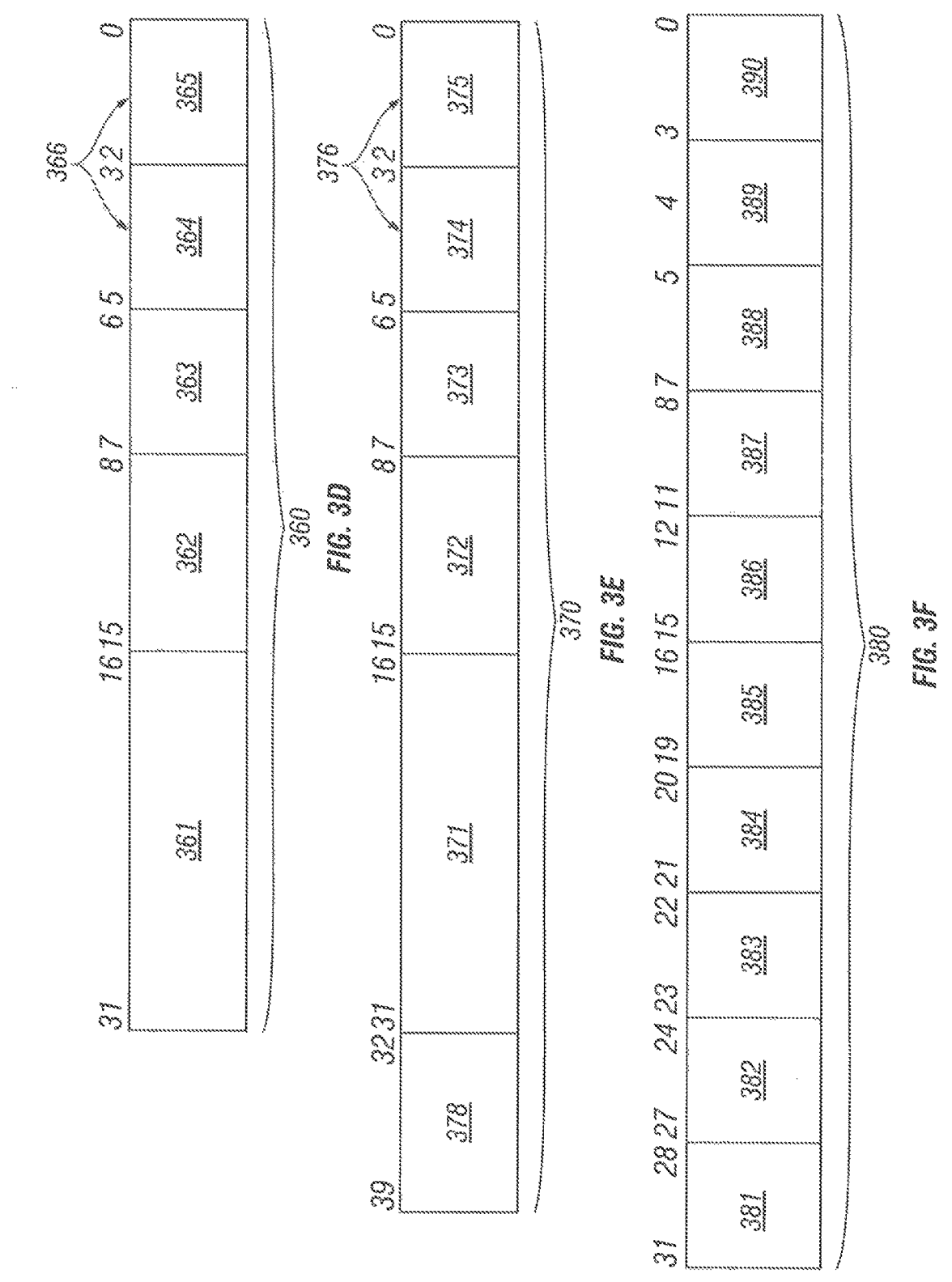

FIG. 3D illustrates an embodiment of an operation encoding (opcode). Furthermore, format 360 may include register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel.com/design/litcentr. In one embodiment, an instruction may be encoded by one or more of fields 361 and 362. Up to two operand locations per instruction may be identified, including up to two source operand identifiers 364 and 365. In one embodiment, destination operand identifier 366 may be the same as source operand identifier 364, whereas in other embodiments they may be different. In another embodiment, destination operand identifier 366 may be the same as source operand identifier 365, whereas in other embodiments they may be different. In one embodiment, one of the source operands identified by source operand identifiers 364 and 365 may be overwritten by the results of the text string comparison operations, whereas in other embodiments identifier 364 corresponds to a source register element and identifier 365 corresponds to a destination register element. In one embodiment, operand identifiers 364 and 365 may identify 32-bit or 64-bit source and destination operands.

FIG. 3E illustrates another possible operation encoding (opcode) format 370, having forty or more bits, in accordance with embodiments of the present disclosure. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. In one embodiment, prefix byte 378 may be used to identify 32-bit or 64-bit source and destination operands. In one embodiment, destination operand identifier 376 may be the same as source operand identifier 374, whereas in other embodiments they may be different. For another embodiment, destination operand identifier 376 may be the same as source operand identifier 375, whereas in other embodiments they may be different. In one embodiment, an instruction operates on one or more of the operands identified by operand identifiers 374 and 375 and one or more operands identified by operand identifiers 374 and 375 may be overwritten by the results of the instruction, whereas in other embodiments, operands identified by identifiers 374 and 375 may be written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

FIG. 3F illustrates yet another possible operation encoding (opcode) format, in accordance with embodiments of the present disclosure. 64-bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for another embodiment, operations may be encoded by one or more of fields 383, 384, 387, and 388. Up to three operand locations per instruction may be identified, including up to two source operand identifiers 385 and 390 and one destination operand identifier 386. One embodiment of the coprocessor may operate on eight, sixteen, thirty-two, and 64-bit values. In one embodiment, an instruction may be performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection may be done on SIMD fields. For some instructions, the type of saturation may be encoded by field 384.

Figure 4A:
FIG. 4A is a block diagram illustrating an in-order pipeline and a register renaming stage, out-of-order issue/execution pipeline, in accordance with embodiments of the present disclosure.
Figure 4B:
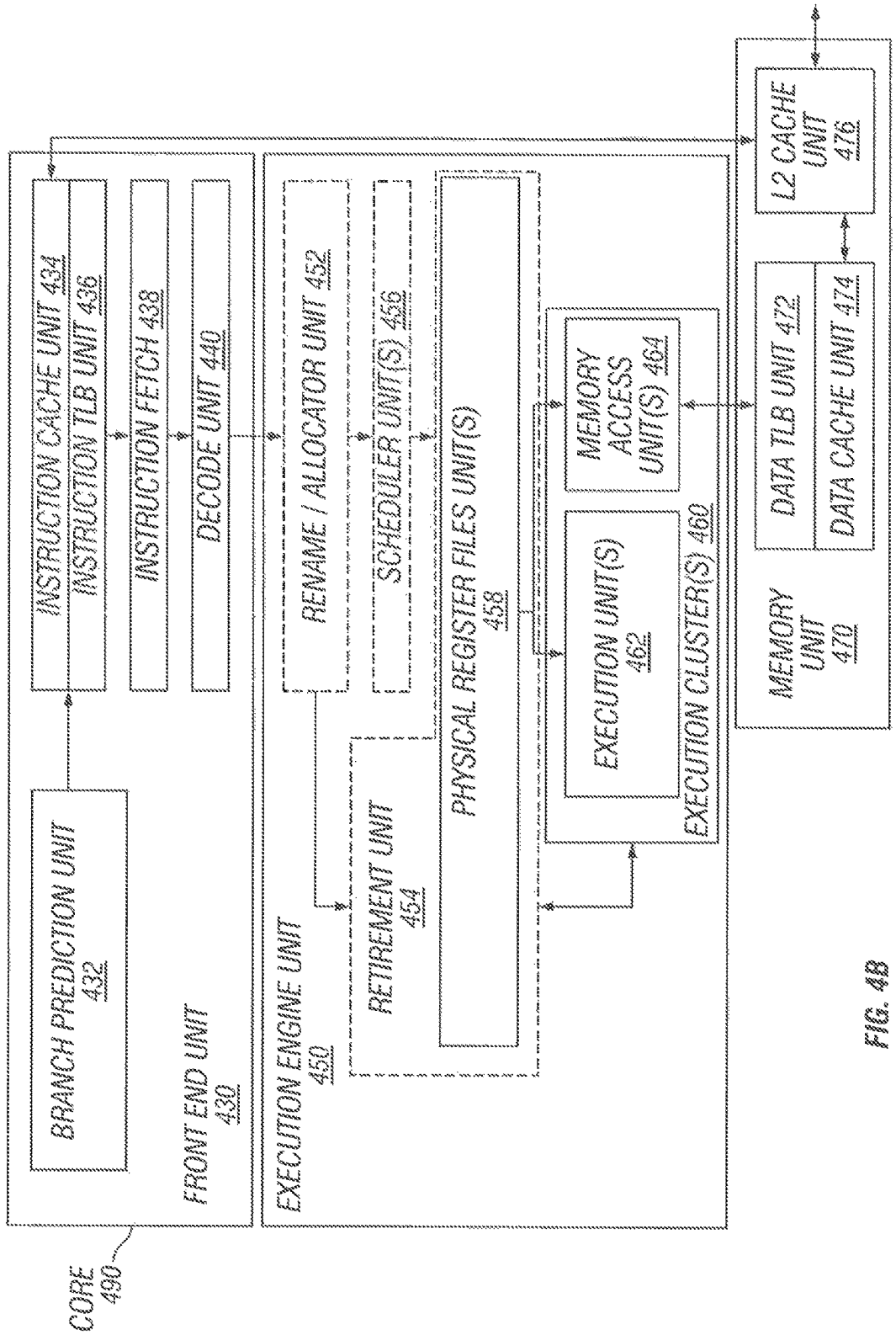
FIG. 4B is a block diagram illustrating an in-order architecture core and a register renaming logic, out-of-order issue/execution logic to be included in a processor, in accordance with embodiments of the present disclosure.

FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and a register renaming logic, out-of-order issue/execution logic to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a write-back/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470.

Core 490 may be a reduced instruction set computing (RISC) core, a complex instruction set computing (CISC) core, a very long instruction word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction translation lookaside buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 454 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 462 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyperthreading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the caches may be external to the core and/or the processor.

Figure 5A:
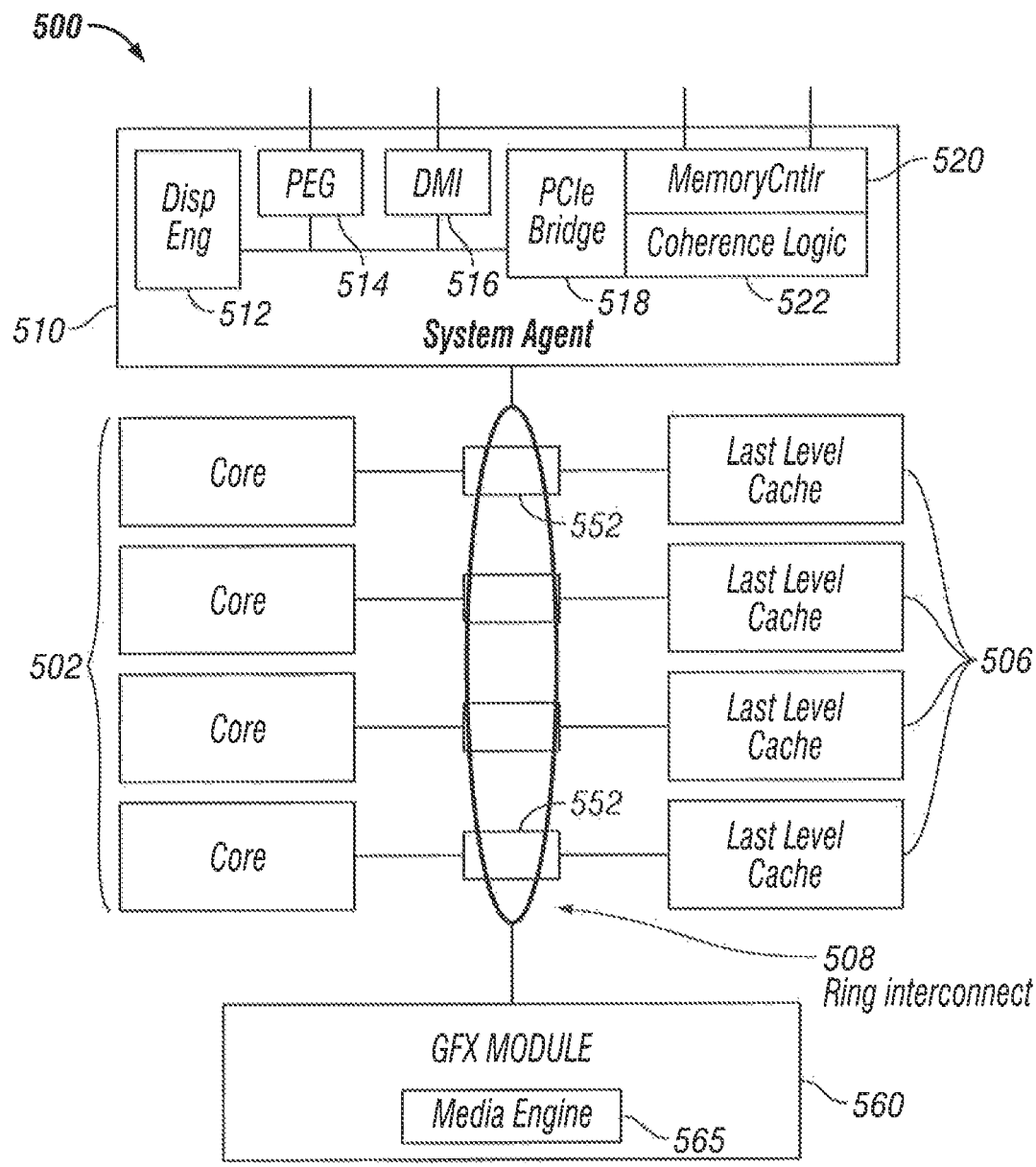
FIG. 5A is a block diagram of a processor, in accordance with embodiments of the present disclosure.

FIG. 5A is a block diagram of a processor 500, in accordance with embodiments of the present disclosure. In one embodiment, processor 500 may include a multicore processor. Processor 500 may include a system agent 510 communicatively coupled to one or more cores 502. Furthermore, cores 502 and system agent 510 may be communicatively coupled to one or more caches 506. Cores 502, system agent 510, and caches 506 may be communicatively coupled via one or more memory control units 552. Furthermore, cores 502, system agent 510, and caches 506 may be communicatively coupled to a graphics module 560 via memory control units 552.

Processor 500 may include any suitable mechanism for interconnecting cores 502, system agent 510, and caches 506, and graphics module 560. In one embodiment, processor 500 may include a ring-based interconnect unit 508 to interconnect cores 502, system agent 510, and caches 506, and graphics module 560. In other embodiments, processor 500 may include any number of well-known techniques for interconnecting such units. Ring-based interconnect unit 508 may utilize memory control units 552 to facilitate interconnections.

Processor 500 may include a memory hierarchy comprising one or more levels of caches within the cores, one or more shared cache units such as caches 506, or external memory (not shown) coupled to the set of integrated memory controller units 552. Caches 506 may include any suitable cache. In one embodiment, caches 506 may include one or more mid-level caches, such as level 2 (L2), level 3 (L3), level 4 (L4), or other levels of cache, a last level cache (LLC), and/or combinations thereof.

In various embodiments, one or more of cores 502 may perform multi-threading. System agent 510 may include components for coordinating and operating cores 502. System agent unit 510 may include for example a power control unit (PCU). The PCU may be or include logic and components needed for regulating the power state of cores 502. System agent 510 may include a display engine 512 for driving one or more externally connected displays or graphics module 560. System agent 510 may include an interface 514 for communications busses for graphics. In one embodiment, interface 514 may be implemented by PCI Express (PCIe). In a further embodiment, interface 514 may be implemented by PCI Express Graphics (PEG). System agent 510 may include a direct media interface (DMI) 516. DMI 516 may provide links between different bridges on a motherboard or other portion of a computer system. System agent 510 may include a PCIe bridge 518 for providing PCIe links to other elements of a computing system. PCIe bridge 518 may be implemented using a memory controller 520 and coherence logic 522.

Cores 502 may be implemented in any suitable manner. Cores 502 may be homogenous or heterogeneous in terms of architecture and/or instruction set. In one embodiment, some of cores 502 may be in-order while others may be out-of-order. In another embodiment, two or more of cores 502 may execute the same instruction set, while others may execute only a subset of that instruction set or a different instruction set.

Processor 500 may include a general-purpose processor, such as a Core™ i3, i5, i7, 2 Duo and Quad, Xeon™, Itanium™, XScale™ or StrongARM™ processor, which may be available from Intel Corporation, of Santa Clara, Calif. Processor 500 may be provided from another company, such as ARM Holdings, Ltd, MIPS, etc. Processor 500 may be a special-purpose processor, such as, for example, a network or communication processor, compression engine, graphics processor, co-processor, embedded processor, or the like. Processor 500 may be implemented on one or more chips. Processor 500 may be a part of and/or may be implemented on one or more substrates using any of a number of process technologies, such as, for example, BiCMOS, CMOS, or NMOS.

In one embodiment, a given one of caches 506 may be shared by multiple ones of cores 502. In another embodiment, a given one of caches 506 may be dedicated to one of cores 502. The assignment of caches 506 to cores 502 may be handled by a cache controller or other suitable mechanism. A given one of caches 506 may be shared by two or more cores 502 by implementing time-slices of a given cache 506.

Graphics module 560 may implement an integrated graphics processing subsystem. In one embodiment, graphics module 560 may include a graphics processor. Furthermore, graphics module 560 may include a media engine 565. Media engine 565 may provide media encoding and video decoding.

Figure 5B:
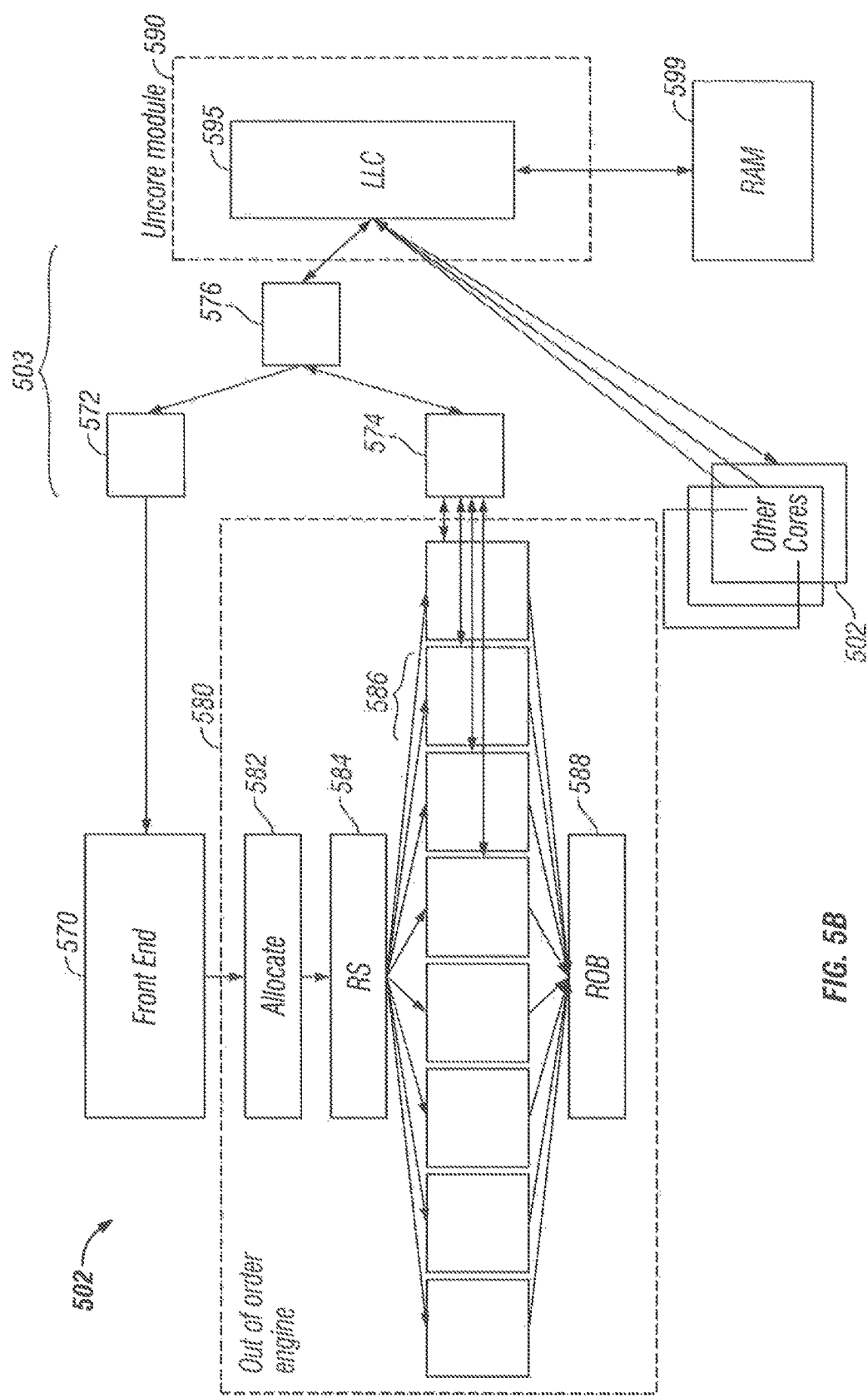
FIG. 5B is a block diagram of an example implementation of a core, in accordance with embodiments of the present disclosure.

FIG. 5B is a block diagram of an example implementation of a core 502, in accordance with embodiments of the present disclosure. Core 502 may include a front end 570 communicatively coupled to an out-of-order engine 580. Core 502 may be communicatively coupled to other portions of processor 500 through cache hierarchy 503.

Front end 570 may be implemented in any suitable manner, such as fully or in part by front end 201 as described above. In one embodiment, front end 570 may communicate with other portions of processor 500 through cache hierarchy 503. In a further embodiment, front end 570 may fetch instructions from portions of processor 500 and prepare the instructions to be used later in the processor pipeline as they are passed to out-of-order execution engine 580.

Out-of-order execution engine 580 may be implemented in any suitable manner, such as fully or in part by out-of-order execution engine 203 as described above. Out-of-order execution engine 580 may prepare instructions received from front end 570 for execution. Out-of-order execution engine 580 may include an allocate module 582. In one embodiment, allocate module 582 may allocate resources of processor 500 or other resources, such as registers or buffers, to execute a given instruction. Allocate module 582 may make allocations in schedulers, such as a memory scheduler, fast scheduler, or floating point scheduler. Such schedulers may be represented in FIG. 5B by resource schedulers 584. Allocate module 582 may be implemented fully or in part by the allocation logic described in conjunction with FIG. 2. Resource schedulers 584 may determine when an instruction is ready to execute based on the readiness of a given resource's sources and the availability of execution resources needed to execute an instruction. Resource schedulers 584 may be implemented by, for example, schedulers 202, 204, 206 as discussed above. Resource schedulers 584 may schedule the execution of instructions upon one or more resources. In one embodiment, such resources may be internal to core 502, and may be illustrated, for example, as resources 586. In another embodiment, such resources may be external to core 502 and may be accessible by, for example, cache hierarchy 503. Resources may include, for example, memory, caches, register files, or registers. Resources internal to core 502 may be represented by resources 586 in FIG. 5B. As necessary, values written to or read from resources 586 may be coordinated with other portions of processor 500 through, for example, cache hierarchy 503. As instructions are assigned resources, they may be placed into a reorder buffer 588. Reorder buffer 588 may track instructions as they are executed and may selectively reorder their execution based upon any suitable criteria of processor 500. In one embodiment, reorder buffer 588 may identify instructions or a series of instructions that may be executed independently. Such instructions or a series of instructions may be executed in parallel from other such instructions. Parallel execution in core 502 may be performed by any suitable number of separate execution blocks or virtual processors. In one embodiment, shared resources—such as memory, registers, and caches—may be accessible to multiple virtual processors within a given core 502. In other embodiments, shared resources may be accessible to multiple processing entities within processor 500.

Cache hierarchy 503 may be implemented in any suitable manner. For example, cache hierarchy 503 may include one or more lower or mid-level caches, such as caches 572, 574. In one embodiment, cache hierarchy 503 may include an LLC 595 communicatively coupled to caches 572, 574. In another embodiment, LLC 595 may be implemented in a module 590 accessible to all processing entities of processor 500. In a further embodiment, module 590 may be implemented in an uncore module of processors from Intel, Inc. Module 590 may include portions or subsystems of processor 500 necessary for the execution of core 502 but might not be implemented within core 502. Besides LLC 595, Module 590 may include, for example, hardware interfaces, memory coherency coordinators, interprocessor interconnects, instruction pipelines, or memory controllers. Access to RAM 599 available to processor 500 may be made through module 590 and, more specifically, LLC 595. Furthermore, other instances of core 502 may similarly access module 590. Coordination of the instances of core 502 may be facilitated in part through module 590.

Figure 6:
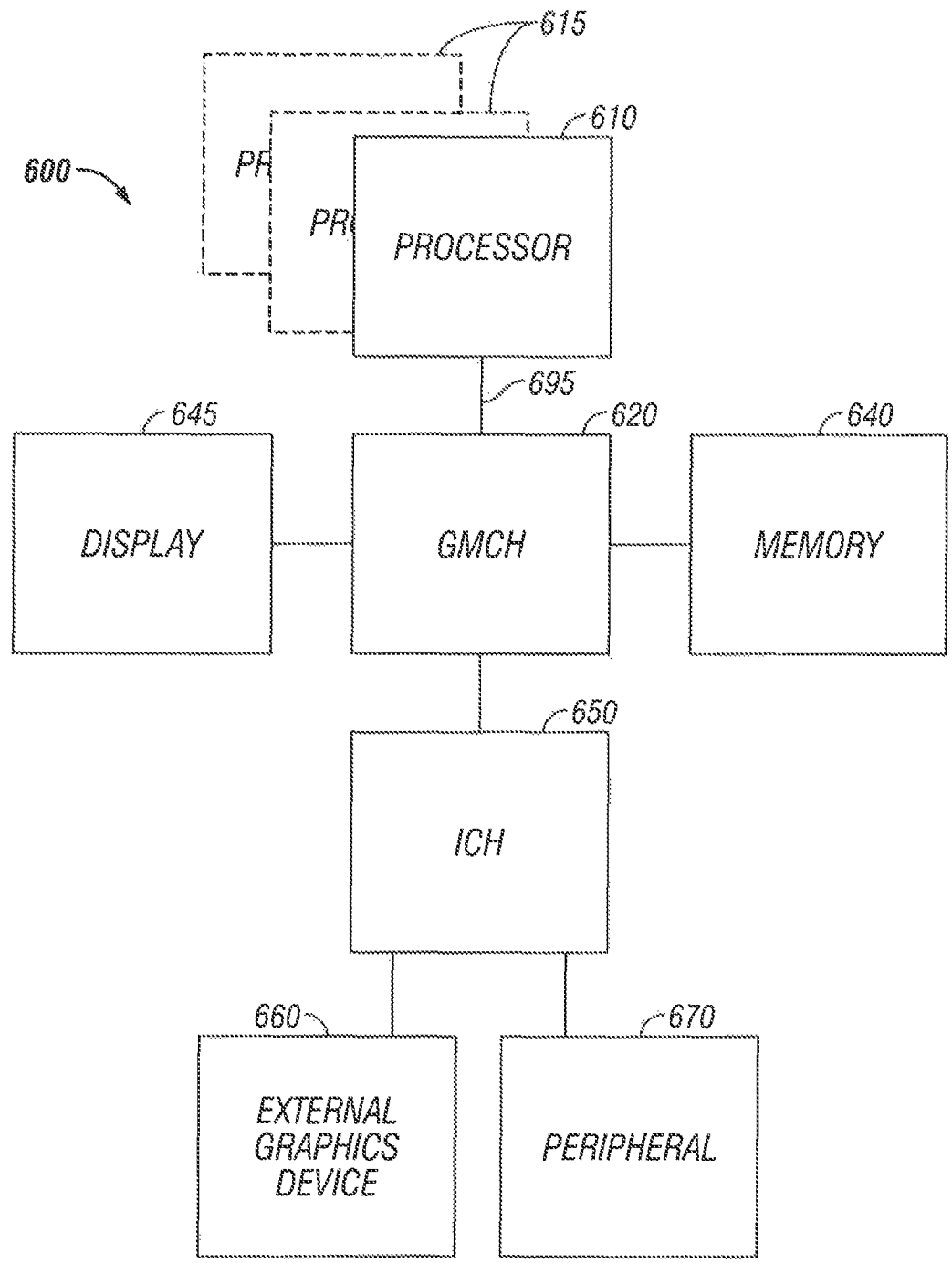
FIG. 6 is a block diagram of a system, in accordance with embodiments of the present disclosure.
Figure 7:
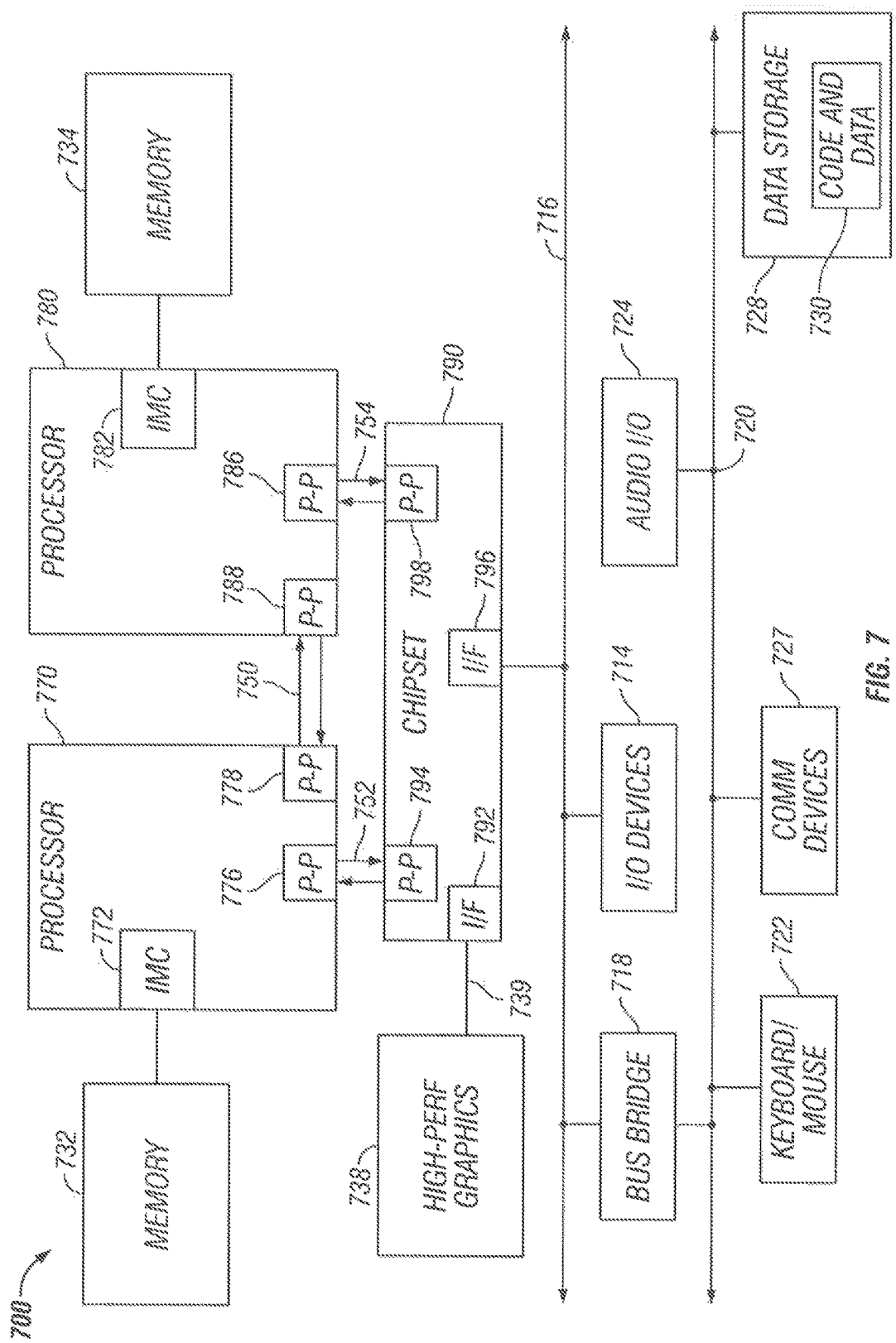
FIG. 7 is a block diagram of a second system, in accordance with embodiments of the present disclosure.
Figure 8:
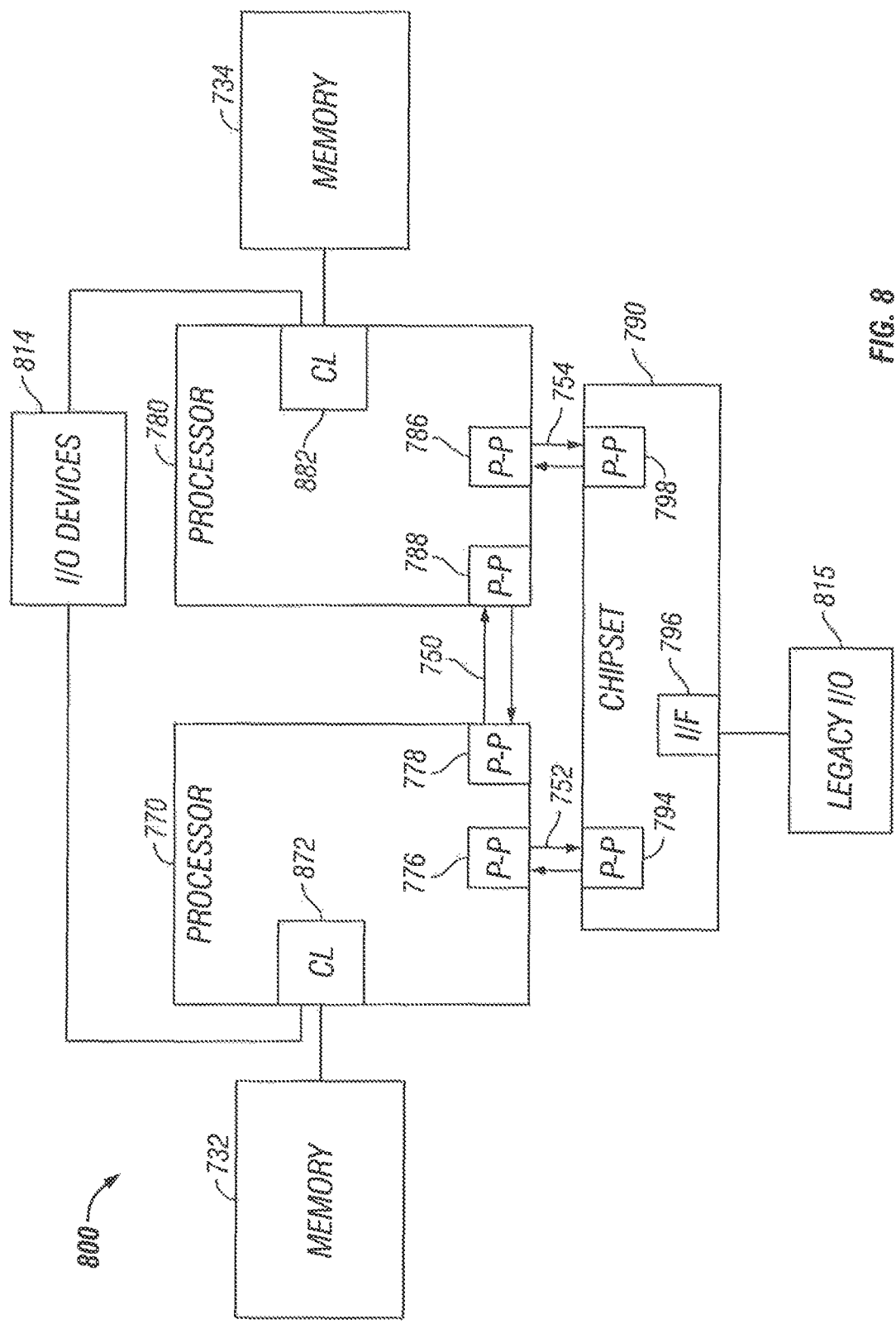
FIG. 8 is a block diagram of a third system in accordance with embodiments of the present disclosure.
Figure 9:
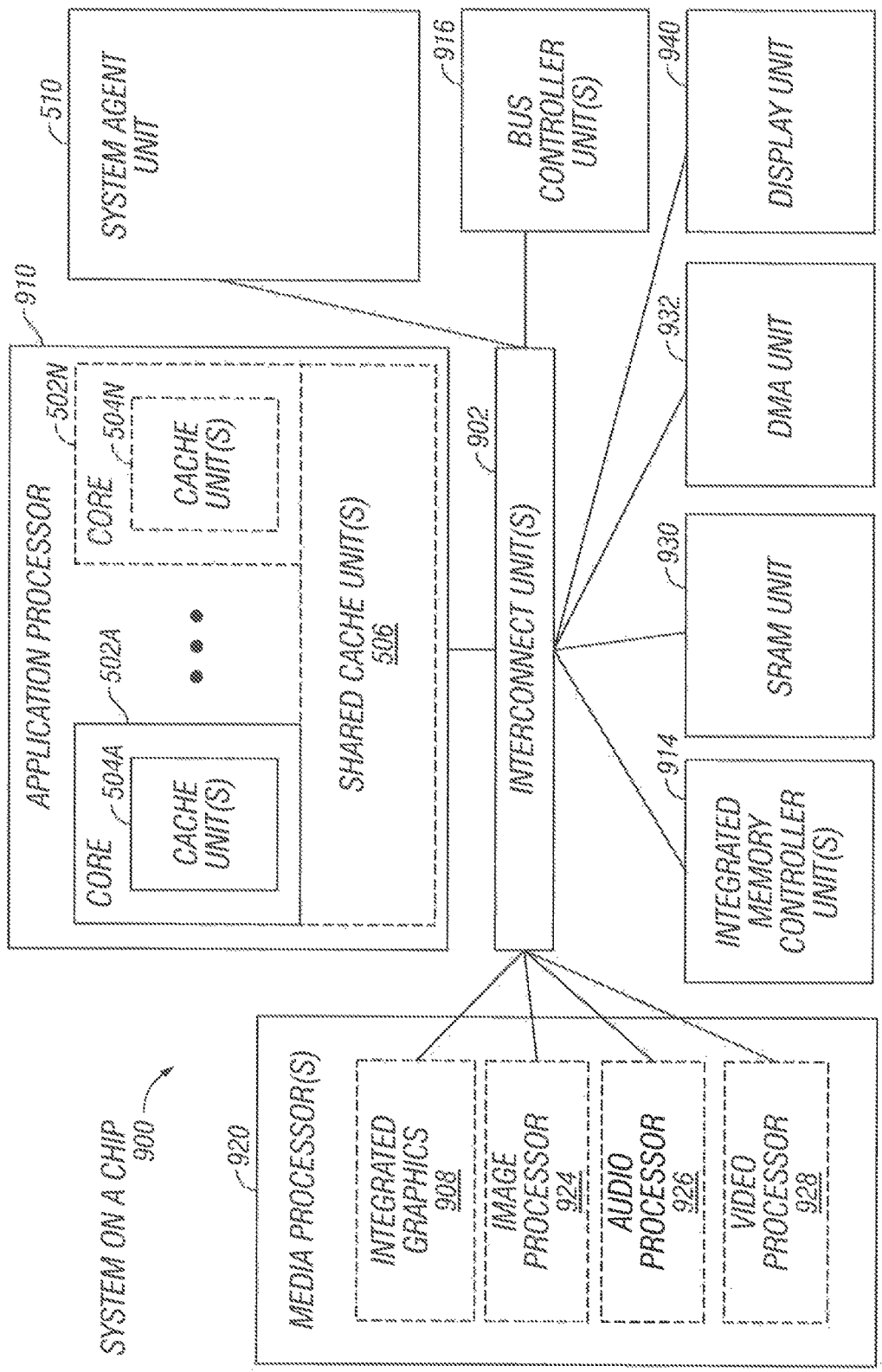
FIG. 9 is a block diagram of a system-on-a-chip, in accordance with embodiments of the present disclosure.

FIGS. 6-8 may illustrate exemplary systems suitable for including processor 500, while FIG. 9 may illustrate an exemplary system on a chip (SoC) that may include one or more of cores 502. Other system designs and implementations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 6 illustrates a block diagram of a system 600, in accordance with embodiments of the present disclosure. System 600 may include one or more processors 610, 615, which may be coupled to graphics memory controller hub (GMCH) 620. The optional nature of additional processors 615 is denoted in FIG. 6 with broken lines.

Each processor 610, 615 may be some version of processor 500. However, it should be noted that integrated graphics logic and integrated memory control units might not exist in processors 610, 615. FIG. 6 illustrates that GMCH 620 may be coupled to a memory 640 that may be, for example, a dynamic random access memory (DRAM). The DRAM may, for at least one embodiment, be associated with a non-volatile cache.

GMCH 620 may be a chipset, or a portion of a chipset. GMCH 620 may communicate with processors 610, 615 and control interaction between processors 610, 615 and memory 640. GMCH 620 may also act as an accelerated bus interface between the processors 610, 615 and other elements of system 600. In one embodiment, GMCH 620 communicates with processors 610, 615 via a multi-drop bus, such as a frontside bus (FSB) 695.

Furthermore, GMCH 620 may be coupled to a display 645 (such as a flat panel display). In one embodiment, GMCH 620 may include an integrated graphics accelerator. GMCH 620 may be further coupled to an input/output (I/O) controller hub (ICH) 650, which may be used to couple various peripheral devices to system 600. External graphics device 660 may include a discrete graphics device coupled to ICH 650 along with another peripheral device 670.

In other embodiments, additional or different processors may also be present in system 600. For example, additional processors 610, 615 may include additional processors that may be the same as processor 610, additional processors that may be heterogeneous or asymmetric to processor 610, accelerators (such as, e.g., graphics accelerators or digital signal processing (DSP) units), field programmable gate arrays, or any other processor. There may be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst processors 610, 615. For at least one embodiment, various processors 610, 615 may reside in the same die package.

FIG. 7 illustrates a block diagram of a second system 700, in accordance with embodiments of the present disclosure. As shown in FIG. 7, multiprocessor system 700 may include a point-to-point interconnect system, and may include a first processor 770 and a second processor 780 coupled via a point-to-point interconnect 750. Each of processors 770 and 780 may be some version of processor 500 as one or more of processors 610, 615.

While FIG. 7 may illustrate two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 may also include as part of its bus controller units point-to-point (P-P) interfaces 776 and 778; similarly, second processor 780 may include P-P interfaces 786 and 788. Processors 770, 780 may exchange information via a point-to-point (P-P) interface 750 using P-P interface circuits 778, 788. As shown in FIG. 7, IMCs 772 and 782 may couple the processors to respective memories, namely a memory 732 and a memory 734, which in one embodiment may be portions of main memory locally attached to the respective processors.

Processors 770, 780 may each exchange information with a chipset 790 via individual P-P interfaces 752, 754 using point to point interface circuits 776, 794, 786, 798. In one embodiment, chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures may be possible. For example, instead of the point-to-point architecture of FIG. 7, a system may implement a multi-drop bus or other such architecture.

FIG. 8 illustrates a block diagram of a third system 800 in accordance with embodiments of the present disclosure. Like elements in FIGS. 7 and 8 bear like reference numerals, and certain aspects of FIG. 7 have been omitted from FIG. 8 in order to avoid obscuring other aspects of FIG. 8.

FIG. 8 illustrates that processors 770, 780 may include integrated memory and I/O control logic ("CL") 872 and 882, respectively. For at least one embodiment, CL 872, 882 may include integrated memory controller units such as that described above in connection with FIGS. 5 and 7. In addition, CL 872, 882 may also include I/O control logic. FIG. 8 illustrates that not only memories 732, 734 may be coupled to CL 872, 882, but also that I/O devices 814 may also be coupled to control logic 872, 882. Legacy I/O devices 815 may be coupled to chipset 790.

FIG. 9 illustrates a block diagram of a SoC 900, in accordance with embodiments of the present disclosure. Similar elements in FIG. 5 bear like reference numerals. Also, dashed lined boxes may represent optional features on more advanced SoCs. An interconnect units 902 may be coupled to: an application processor 910 which may include a set of one or more cores 502A-N and shared cache units 506; a system agent unit 510; a bus controller units 916; an integrated memory controller units 914; a set of one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
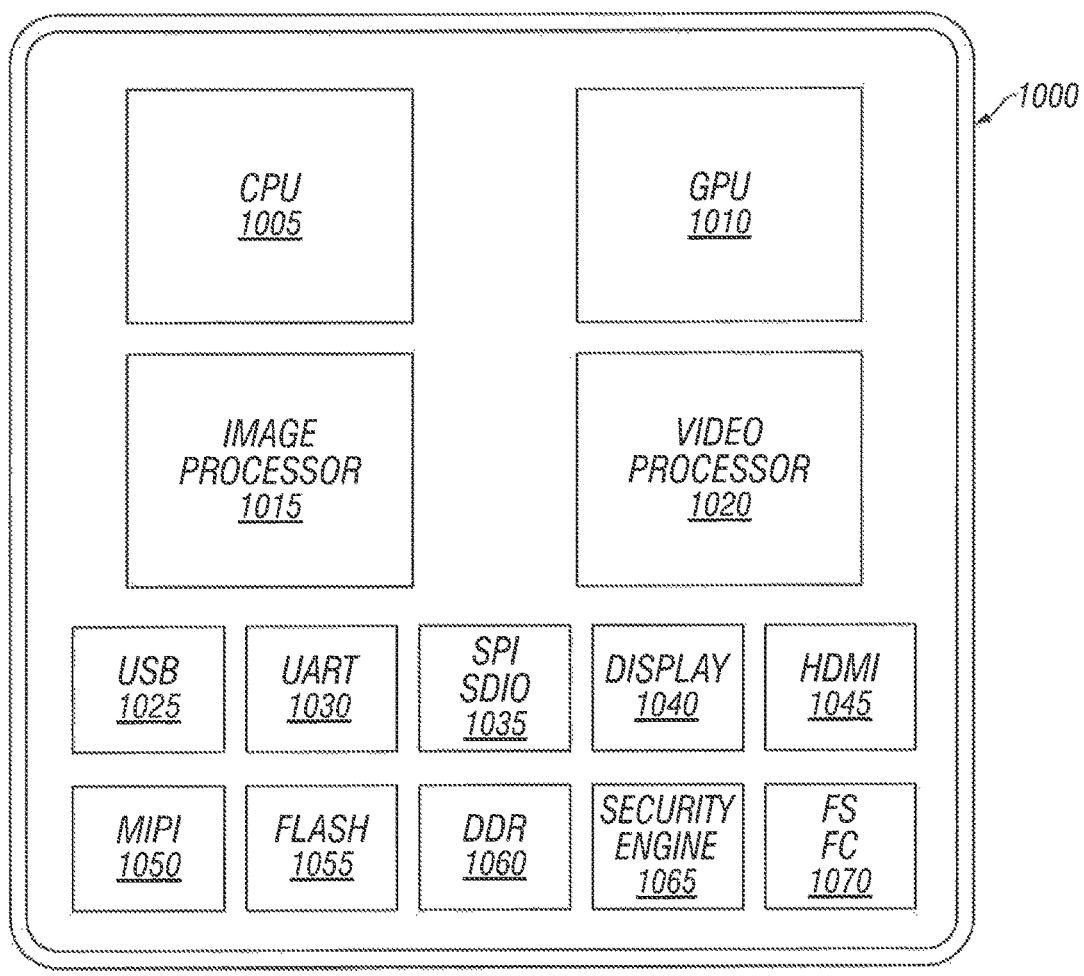
FIG. 10 illustrates a processor containing a central processing unit and a graphics processing unit which may perform at least one instruction, in accordance with embodiments of the present disclosure.

FIG. 10 illustrates a processor containing a central processing unit (CPU) and a graphics processing unit (GPU), which may perform at least one instruction, in accordance with embodiments of the present disclosure. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and I$^2$S/I$^2$C controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine-readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
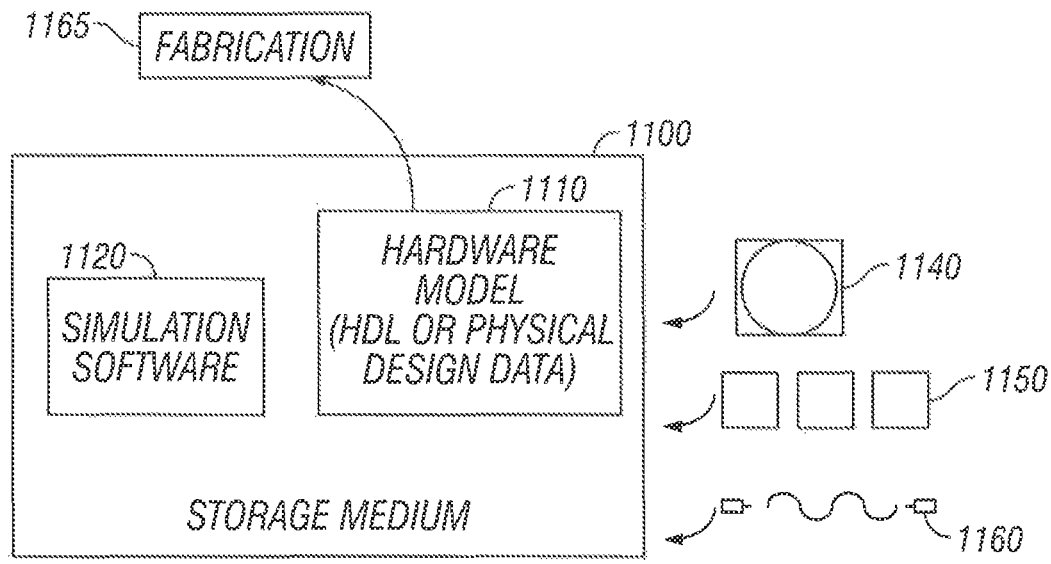
FIG. 11 is a block diagram illustrating the development of IP cores, in accordance with embodiments of the present disclosure.

FIG. 11 illustrates a block diagram illustrating the development of IP cores, in accordance with embodiments of the present disclosure. Storage 1100 may include simulation software 1120 and/or hardware or software model 1110. In one embodiment, the data representing the IP core design may be provided to storage 1100 via memory 1140 (e.g., hard disk), wired connection (e.g., internet) 1150 or wireless connection 1160. The IP core information generated by the simulation tool and model may then be transmitted to a fabrication facility 1165 where it may be fabricated by a 3$^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
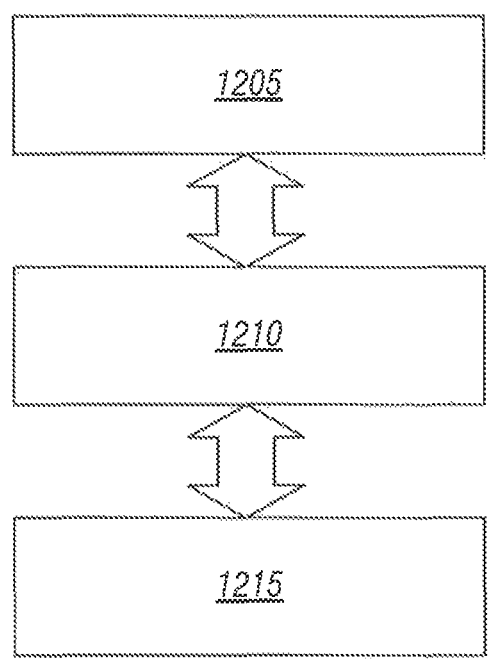
FIG. 12 illustrates how an instruction of a first type may be emulated by a processor of a different type, in accordance with embodiments of the present disclosure.

FIG. 12 illustrates how an instruction of a first type may be emulated by a processor of a different type, in accordance with embodiments of the present disclosure. In FIG. 12, program 1205 contains some instructions that may perform the same or substantially the same function as an instruction according to one embodiment. However the instructions of program 1205 may be of a type and/or format that is different from or incompatible with processor 1215, meaning the instructions of the type in program 1205 may not be able to execute natively by the processor 1215. However, with the help of emulation logic, 1210, the instructions of program 1205 may be translated into instructions that may be natively be executed by the processor 1215. In one embodiment, the emulation logic may be embodied in hardware. In another embodiment, the emulation logic may be embodied in a tangible, machine-readable medium containing software to translate instructions of the type in program 1205 into the type natively executable by processor 1215. In other embodiments, emulation logic may be a combination of fixed-function or programmable hardware and a program stored on a tangible, machine-readable medium. In one embodiment, the processor contains the emulation logic, whereas in other embodiments, the emulation logic exists outside of the processor and may be provided by a third party. In one embodiment, the processor may load the emulation logic embodied in a tangible, machine-readable medium containing software by executing microcode or firmware contained in or associated with the processor.

Figure 13:
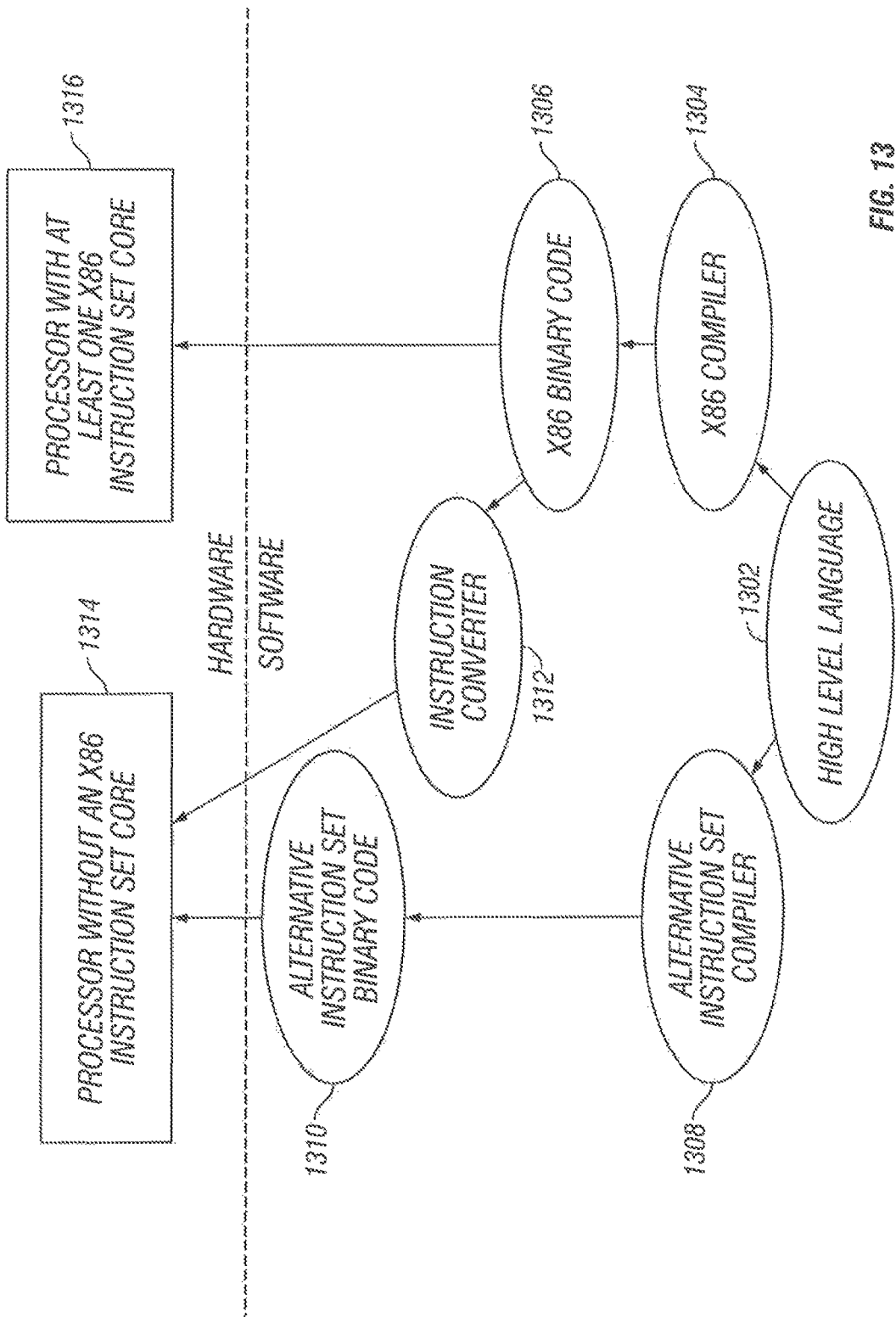
FIG. 13 illustrates a block diagram contrasting the use of a software instruction converter to convert binary instructions in a source instruction set to binary instructions in a target instruction set, in accordance with embodiments of the present disclosure.

FIG. 13 illustrates a block diagram contrasting the use of a software instruction converter to convert binary instructions in a source instruction set to binary instructions in a target instruction set, in accordance with embodiments of the present disclosure. In the illustrated embodiment, the instruction converter may be a software instruction converter, although the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. x86 compiler 1304 represents a compiler that may be operable to generate x86 binary code 1306 (e.g., object code) that may, with or without additional linkage processing, be executed on the processor with at least one x86 instruction set core 1316. Similarly, FIG. 13 shows the program in high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1312 may be used to convert x86 binary code 1306 into code that may be natively executed by the processor without an x86 instruction set core 1314. This converted code might not be the same as alternative instruction set binary code 1310; however, the converted code will accomplish the general operation and be made up of instructions from the alternative instruction set. Thus, instruction converter 1312 represents software, firmware, hardware, or a combination thereof that, through emulation, simulation or any other process, allows a processor or other electronic device that does not have an x86 instruction set processor or core to execute x86 binary code 1306.

Figure 14:
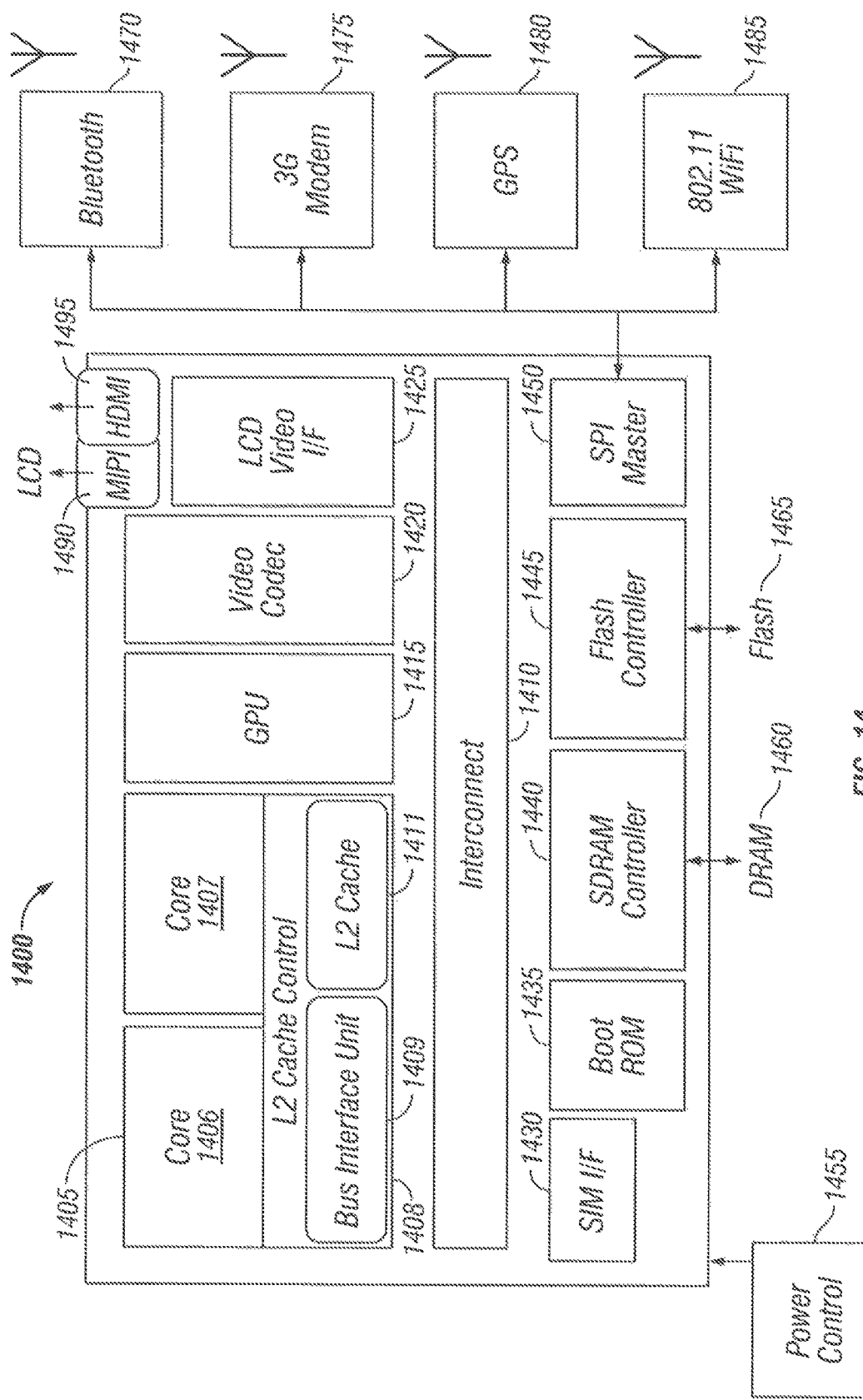
FIG. 14 is a block diagram of an instruction set architecture of a processor, in accordance with embodiments of the present disclosure.

FIG. 14 is a block diagram of an instruction set architecture 1400 of a processor, in accordance with embodiments of the present disclosure. Instruction set architecture 1400 may include any suitable number or kind of components.

For example, instruction set architecture 1400 may include processing entities such as one or more cores 1406, 1407 and a graphics processing unit 1415. Cores 1406, 1407 may be communicatively coupled to the rest of instruction set architecture 1400 through any suitable mechanism, such as through a bus or cache. In one embodiment, cores 1406, 1407 may be communicatively coupled through an L2 cache control 1408, which may include a bus interface unit 1409 and an L2 cache 1411. Cores 1406, 1407 and graphics processing unit 1415 may be communicatively coupled to each other and to the remainder of instruction set architecture 1400 through interconnect 1410. In one embodiment, graphics processing unit 1415 may use a video code 1420 defining the manner in which particular video signals will be encoded and decoded for output.

Instruction set architecture 1400 may also include any number or kind of interfaces, controllers, or other mechanisms for interfacing or communicating with other portions of an electronic device or system. Such mechanisms may facilitate interaction with, for example, peripherals, communications devices, other processors, or memory. In the example of FIG. 14, instruction set architecture 1400 may include a liquid crystal display (LCD) video interface 1425, a subscriber interface module (SIM) interface 1430, a boot ROM interface 1435, a synchronous dynamic random access memory (SDRAM) controller 1440, a flash controller 1445, and a serial peripheral interface (SPI) master unit 1450. LCD video interface 1425 may provide output of video signals from, for example, GPU 1415 and through, for example, a mobile industry processor interface (MIPI) 1490 or a high-definition multimedia interface (HDMI) 1495 to a display. Such a display may include, for example, an LCD. SIM interface 1430 may provide access to or from a SIM card or device. SDRAM controller 1440 may provide access to or from memory such as an SDRAM chip or module 1460. Flash controller 1445 may provide access to or from memory such as flash memory 1465 or other instances of RAM. SPI master unit 1450 may provide access to or from communications modules, such as a Bluetooth module 1470, high-speed 3G modem 1475, global positioning system module 1480, or wireless module 1485 implementing a communications standard such as 802.11.

Figure 15:
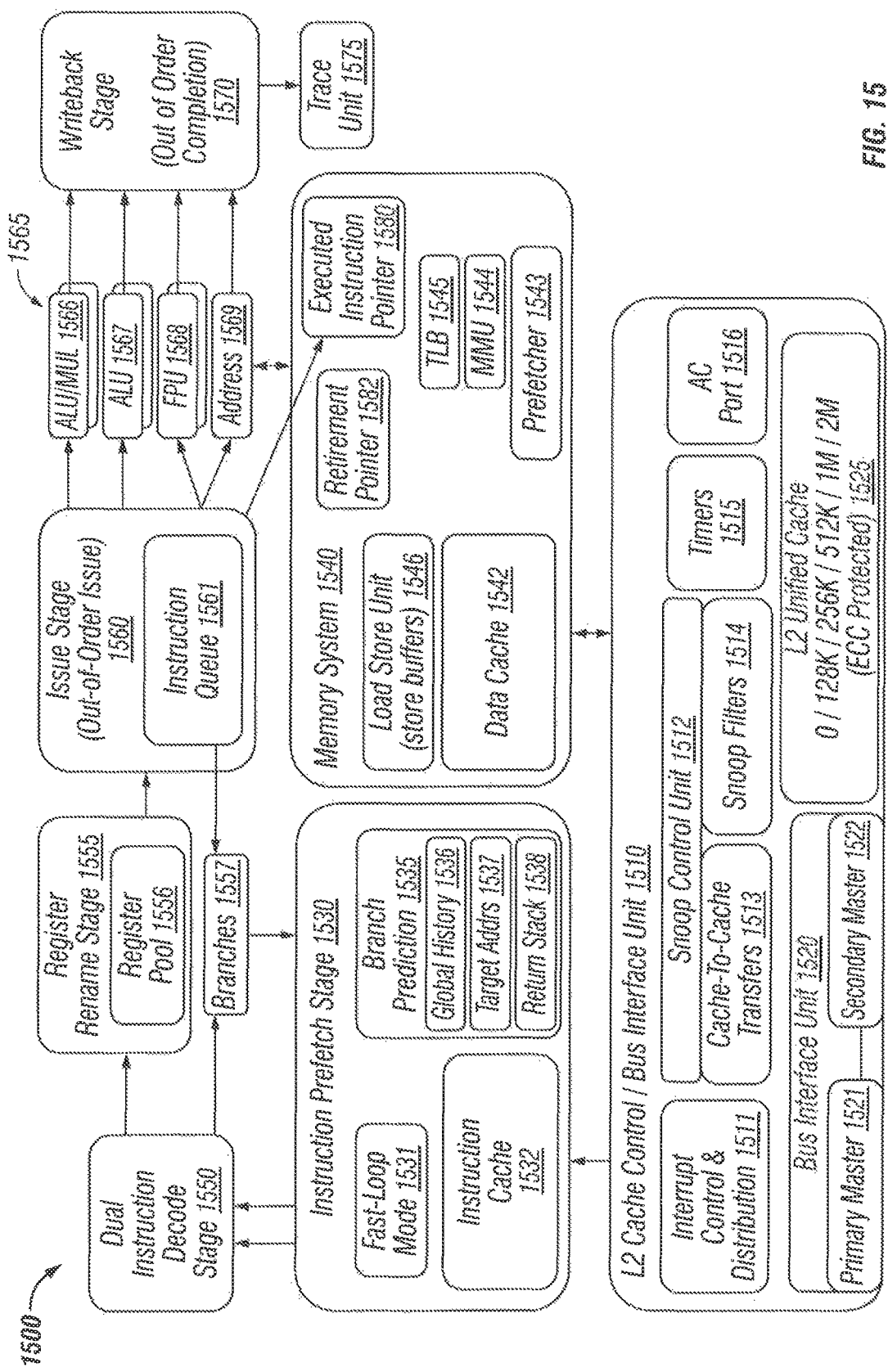
FIG. 15 is a more detailed block diagram of an instruction set architecture of a processor, in accordance with embodiments of the present disclosure.

FIG. 15 is a more detailed block diagram of an instruction set architecture 1500 of a processor, in accordance with embodiments of the present disclosure. Instruction architecture 1500 may implement one or more aspects of instruction set architecture 1400. Furthermore, instruction set architecture 1500 may illustrate modules and mechanisms for the execution of instructions within a processor.

Instruction architecture 1500 may include a memory system 1540 communicatively coupled to one or more execution entities 1565. Furthermore, instruction architecture 1500 may include a caching and bus interface unit such as unit 1510 communicatively coupled to execution entities 1565 and memory system 1540. In one embodiment, loading of instructions into execution entities 1565 may be performed by one or more stages of execution. Such stages may include, for example, instruction prefetch stage 1530, dual instruction decode stage 1550, register rename stage 1555, issue stage 1560, and writeback stage 1570.

In one embodiment, memory system 1540 may include an executed instruction pointer 1580. Executed instruction pointer 1580 may store a value identifying the oldest, undispatched instruction within a batch of instructions. The oldest instruction may correspond to the lowest Program Order (PO) value. A PO may include a unique number of an instruction. Such an instruction may be a single instruction within a thread represented by multiple strands. A PO may be used in ordering instructions to ensure correct execution semantics of code. A PO may be reconstructed by mechanisms such as evaluating increments to PO encoded in the instruction rather than an absolute value. Such a reconstructed PO may be known as an "RPO." Although a PO may be referenced herein, such a PO may be used interchangeably with an RPO. A strand may include a sequence of instructions that are data dependent upon each other. The strand may be arranged by a binary translator at compilation time. Hardware executing a strand may execute the instructions of a given strand in order according to the PO of the various instructions. A thread may include multiple strands such that instructions of different strands may depend upon each other. A PO of a given strand may be the PO of the oldest instruction in the strand which has not yet been dispatched to execution from an issue stage. Accordingly, given a thread of multiple strands, each strand including instructions ordered by PO, executed instruction pointer 1580 may store the oldest—illustrated by the lowest number—PO in the thread.

In another embodiment, memory system 1540 may include a retirement pointer 1582. Retirement pointer 1582 may store a value identifying the PO of the last retired instruction. Retirement pointer 1582 may be set by, for example, retirement unit 454. If no instructions have yet been retired, retirement pointer 1582 may include a null value.

Execution entities 1565 may include any suitable number and kind of mechanisms by which a processor may execute instructions. In the example of FIG. 15, execution entities 1565 may include ALU/multiplication units (MUL) 1566, ALUs 1567, and floating point units (FPU) 1568. In one embodiment, such entities may make use of information contained within a given address 1569. Execution entities 1565 in combination with stages 1530, 1550, 1555, 1560, 1570 may collectively form an execution unit.

Unit 1510 may be implemented in any suitable manner. In one embodiment, unit 1510 may perform cache control. In such an embodiment, unit 1510 may thus include a cache 1525. Cache 1525 may be implemented, in a further embodiment, as an L2 unified cache with any suitable size, such as zero, 128 k, 256 k, 512 k, 1M, or 2M bytes of memory. In another, further embodiment, cache 1525 may be implemented in error-correcting code memory. In another embodiment, unit 1510 may perform bus interfacing to other portions of a processor or electronic device. In such an embodiment, unit 1510 may thus include a bus interface unit 1520 for communicating over an interconnect, intraprocessor bus, interprocessor bus, or other communication bus, port, or line. Bus interface unit 1520 may provide interfacing in order to perform, for example, generation of the memory and input/output addresses for the transfer of data between execution entities 1565 and the portions of a system external to instruction architecture 1500.

To further facilitate its functions, bus interface unit 1510 may include an interrupt control and distribution unit 1511 for generating interrupts and other communications to other portions of a processor or electronic device. In one embodiment, bus interface unit 1510 may include a snoop control unit 1512 that handles cache access and coherency for multiple processing cores. In a further embodiment, to provide such functionality, snoop control unit 1512 may include a cache-to-cache transfer unit 1513 that handles information exchanges between different caches. In another, further embodiment, snoop control unit 1512 may include one or more snoop filters 1514 that monitors the coherency of other caches (not shown) so that a cache controller, such as unit 1510, does not have to perform such monitoring directly. Unit 1510 may include any suitable number of timers 1515 for synchronizing the actions of instruction architecture 1500. Also, unit 1510 may include an AC port 1516.

Memory system 1540 may include any suitable number and kind of mechanisms for storing information for the processing needs of instruction architecture 1500. In one embodiment, memory system 1540 may include a load store unit 1546 for storing information such as buffers written to or read back from memory or registers. In another embodiment, memory system 1540 may include a translation lookaside buffer (TLB) 1545 that provides look-up of address values between physical and virtual addresses. In yet another embodiment, memory system 1540 may include a memory management unit (MMU) 1544 for facilitating access to virtual memory. In still yet another embodiment, memory system 1540 may include a prefetcher 1543 for requesting instructions from memory before such instructions are actually needed to be executed, in order to reduce latency.

The operation of instruction architecture 1500 to execute an instruction may be performed through different stages. For example, using unit 1510 instruction prefetch stage 1530 may access an instruction through prefetcher 1543. Instructions retrieved may be stored in instruction cache 1532. Prefetch stage 1530 may enable an option 1531 for fast-loop mode, wherein a series of instructions forming a loop that is small enough to fit within a given cache are executed. In one embodiment, such an execution may be performed without needing to access additional instructions from, for example, instruction cache 1532. Determination of what instructions to prefetch may be made by, for example, branch prediction unit 1535, which may access indications of execution in global history 1536, indications of target addresses 1537, or contents of a return stack 1538 to determine which of branches 1557 of code will be executed next. Such branches may be possibly prefetched as a result. Branches 1557 may be produced through other stages of operation as described below. Instruction prefetch stage 1530 may provide instructions as well as any predictions about future instructions to dual instruction decode stage 1550.

Dual instruction decode stage 1550 may translate a received instruction into microcode-based instructions that may be executed. Dual instruction decode stage 1550 may simultaneously decode two instructions per clock cycle. Furthermore, dual instruction decode stage 1550 may pass its results to register rename stage 1555. In addition, dual instruction decode stage 1550 may determine any resulting branches from its decoding and eventual execution of the microcode. Such results may be input into branches 1557.

Register rename stage 1555 may translate references to virtual registers or other resources into references to physical registers or resources. Register rename stage 1555 may include indications of such mapping in a register pool 1556. Register rename stage 1555 may alter the instructions as received and send the result to issue stage 1560.

Issue stage 1560 may issue or dispatch commands to execution entities 1565. Such issuance may be performed in an out-of-order fashion. In one embodiment, multiple instructions may be held at issue stage 1560 before being executed. Issue stage 1560 may include an instruction queue 1561 for holding such multiple commands. Instructions may be issued by issue stage 1560 to a particular processing entity 1565 based upon any acceptable criteria, such as availability or suitability of resources for execution of a given instruction. In one embodiment, issue stage 1560 may reorder the instructions within instruction queue 1561 such that the first instructions received might not be the first instructions executed. Based upon the ordering of instruction queue 1561, additional branching information may be provided to branches 1557. Issue stage 1560 may pass instructions to executing entities 1565 for execution.

Upon execution, writeback stage 1570 may write data into registers, queues, or other structures of instruction set architecture 1500 to communicate the completion of a given command. Depending upon the order of instructions arranged in issue stage 1560, the operation of writeback stage 1570 may enable additional instructions to be executed. Performance of instruction set architecture 1500 may be monitored or debugged by trace unit 1575.

Figure 16:
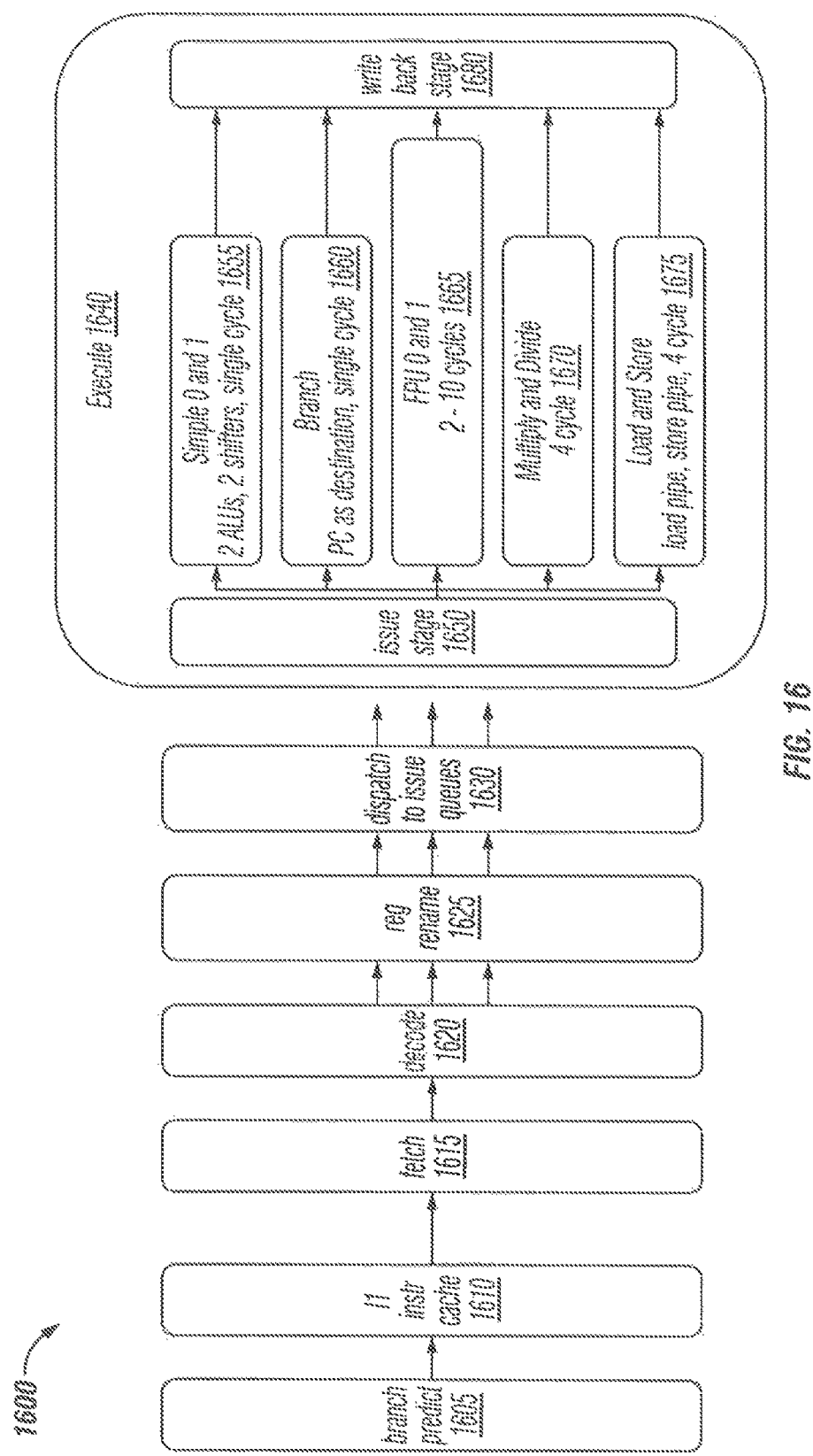
FIG. 16 is a block diagram of an execution pipeline for an instruction set architecture of a processor, in accordance with embodiments of the present disclosure.

FIG. 16 is a block diagram of an execution pipeline 1600 for an instruction set architecture of a processor, in accordance with embodiments of the present disclosure. Execution pipeline 1600 may illustrate operation of, for example, instruction architecture 1500 of FIG. 15.

Execution pipeline 1600 may include any suitable combination of steps or operations. In 1605, predictions of the branch that is to be executed next may be made. In one embodiment, such predictions may be based upon previous executions of instructions and the results thereof. In 1610, instructions corresponding to the predicted branch of execution may be loaded into an instruction cache. In 1615, one or more such instructions in the instruction cache may be fetched for execution. In 1620, the instructions that have been fetched may be decoded into microcode or more specific machine language. In one embodiment, multiple instructions may be simultaneously decoded. In 1625, references to registers or other resources within the decoded instructions may be reassigned. For example, references to virtual registers may be replaced with references to corresponding physical registers. In 1630, the instructions may be dispatched to queues for execution. In 1640, the instructions may be executed. Such execution may be performed in any suitable manner. In 1650, the instructions may be issued to a suitable execution entity. The manner in which the instruction is executed may depend upon the specific entity executing the instruction. For example, at 1655, an ALU may perform arithmetic functions. The ALU may utilize a single clock cycle for its operation, as well as two shifters. In one embodiment, two ALUs may be employed, and thus two instructions may be executed at 1655. At 1660, a determination of a resulting branch may be made. A program counter may be used to designate the destination to which the branch will be made. 1660 may be executed within a single clock cycle. At 1665, floating point arithmetic may be performed by one or more FPUs. The floating point operation may require multiple clock cycles to execute, such as two to ten cycles. At 1670, multiplication and division operations may be performed. Such operations may be performed in four clock cycles. At 1675, loading and storing operations to registers or other portions of pipeline 1600 may be performed. The operations may include loading and storing addresses. Such operations may be performed in four clock cycles. At 1680, write-back operations may be performed as required by the resulting operations of 1655-1675.

Figure 17:
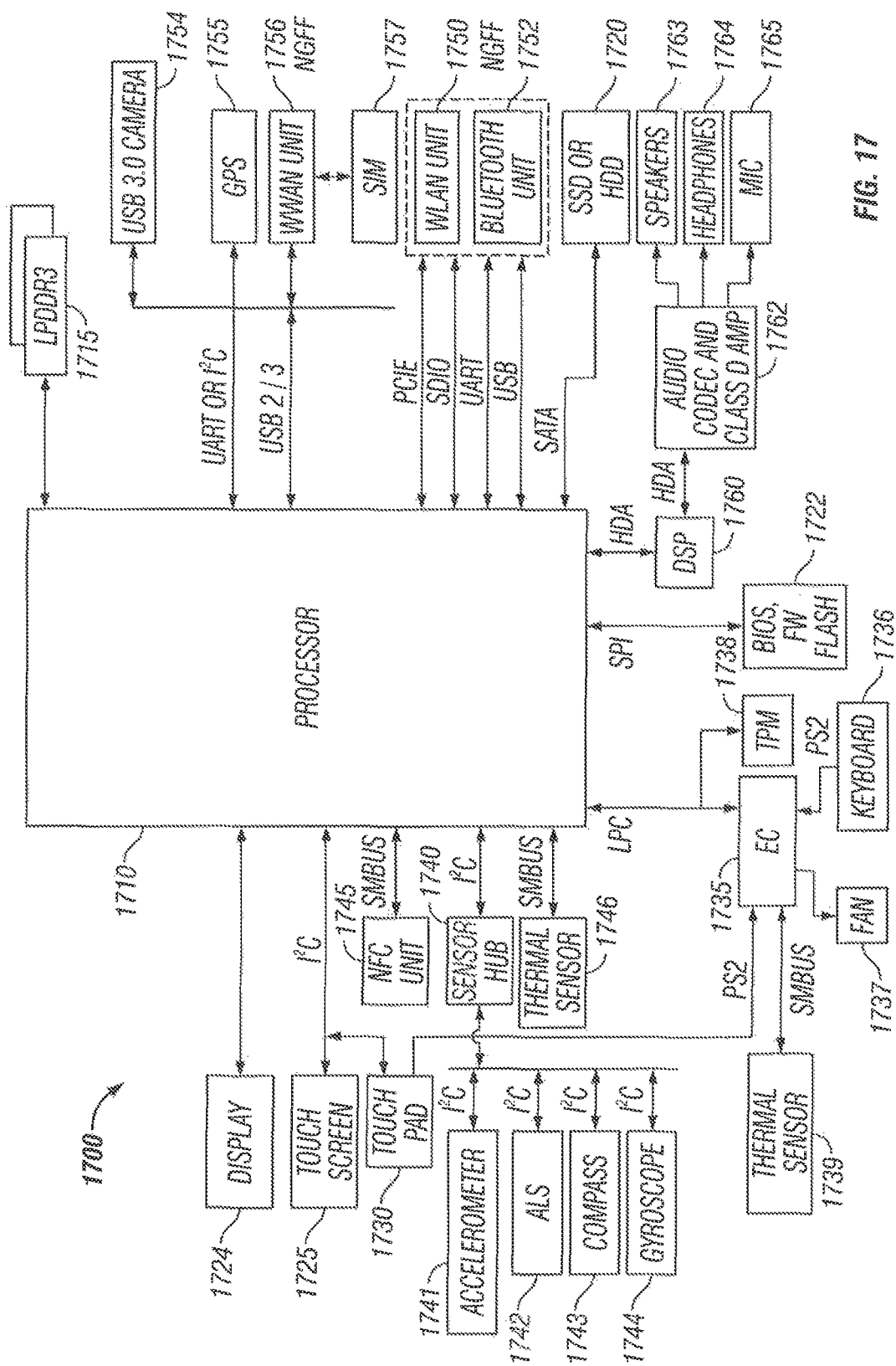
FIG. 17 is a block diagram of an electronic device for utilizing a processor, in accordance with embodiments of the present disclosure.

FIG. 17 is a block diagram of an electronic device 1700 for utilizing a processor 1710, in accordance with embodiments of the present disclosure. Electronic device 1700 may include, for example, a notebook, an ultrabook, a computer, a tower server, a rack server, a blade server, a laptop, a desktop, a tablet, a mobile device, a phone, an embedded computer, or any other suitable electronic device.

Electronic device 1700 may include processor 1710 communicatively coupled to any suitable number or kind of components, peripherals, modules, or devices. Such coupling may be accomplished by any suitable kind of bus or interface, such as $I^2C$ bus, system management bus (SMBus), low pin count (LPC) bus, SPI, high definition audio (HDA) bus, Serial Advance Technology Attachment (SATA) bus, USB bus (versions 1, 2, 3), or Universal Asynchronous Receiver/Transmitter (UART) bus.

Such components may include, for example, a display 1724, a touch screen 1725, a touch pad 1730, a near field communications (NFC) unit 1745, a sensor hub 1740, a thermal sensor 1746, an express chipset (EC) 1735, a trusted platform module (TPM) 1738, BIOS/firmware/flash memory 1722, a digital signal processor 1760, a drive 1720 such as a solid state disk (SSD) or a hard disk drive (HDD), a wireless local area network (WLAN) unit 1750, a Bluetooth unit 1752, a wireless wide area network (WWAN) unit 1756, a global positioning system (GPS) 1775, a camera 1754 such as a USB 3.0 camera, or a low power double data rate (LPDDR) memory unit 1715 implemented in, for example, the LPDDR3 standard. These components may each be implemented in any suitable manner.

Furthermore, in various embodiments other components may be communicatively coupled to processor 1710 through the components discussed above. For example, an accelerometer 1741, ambient light sensor (ALS) 1742, compass 1743, and gyroscope 1744 may be communicatively coupled to sensor hub 1740. A thermal sensor 1739, fan 1737, keyboard 1736, and touch pad 1730 may be communicatively coupled to EC 1735. Speakers 1763, headphones 1764, and a microphone 1765 may be communicatively coupled to an audio unit 1762, which may in turn be communicatively coupled to DSP 1760. Audio unit 1762 may include, for example, an audio codec and a class D amplifier. A SIM card 1757 may be communicatively coupled to WWAN unit 1756. Components such as WLAN unit 1750 and Bluetooth unit 1752, as well as WWAN unit 1756 may be implemented in a next generation form factor (NGFF).

Figure 18:
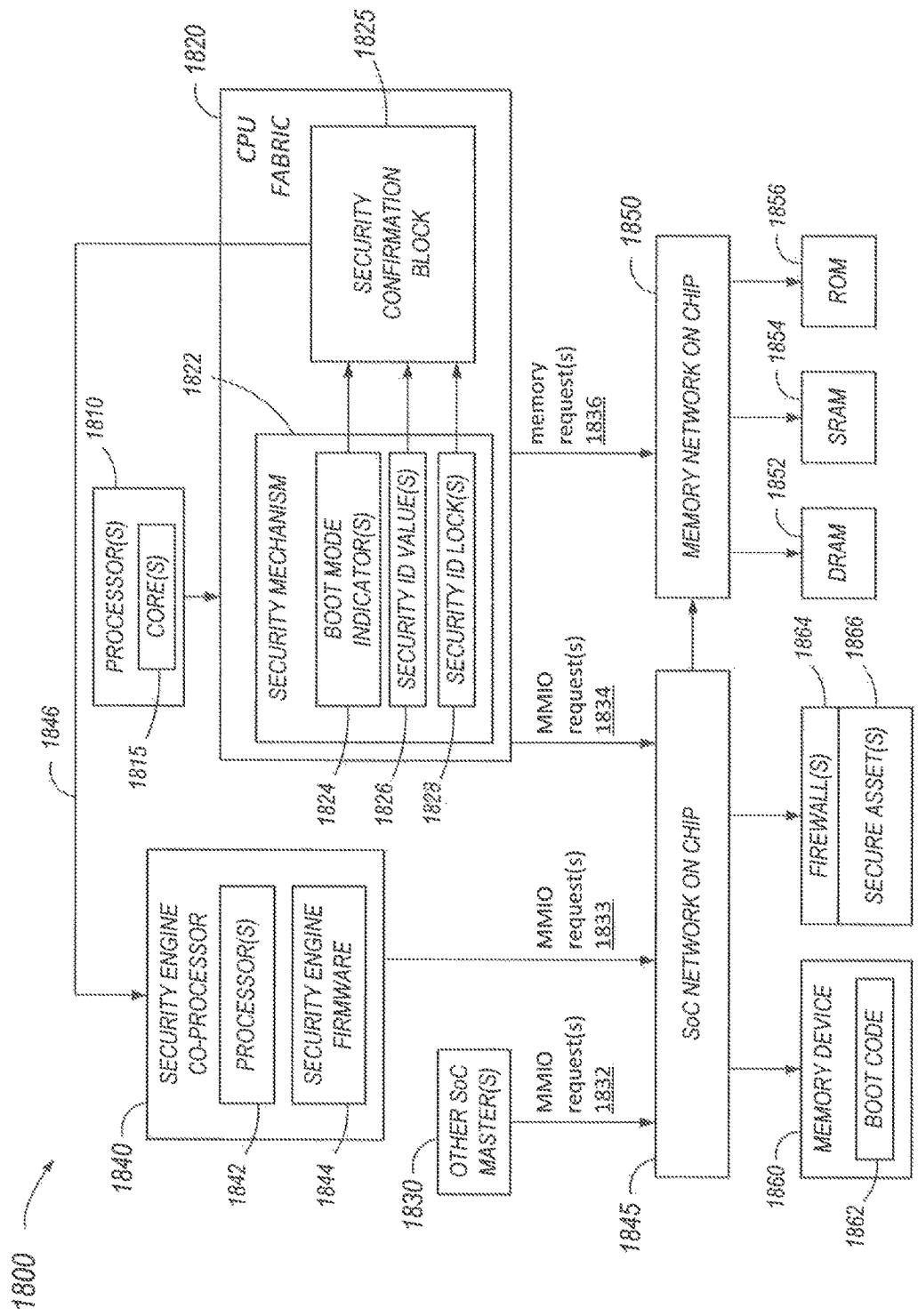
FIG. 18 is an illustration of an example system for migrating trusted security attributes to a security co-processor in an SoC architecture, according to embodiments of the present disclosure.

Embodiments of the present disclosure involve processing logic or circuitry for migrating trusted security attributes from a host CPU in an SoC architecture to a security co-processor. FIG. 18 is an illustration of an example system 1800 for migrating trusted security attributes from a host CPU in an SoC architecture to a security co-processor, according to embodiments of the present disclosure. This approach may be used, in some embodiments, to restrict access to secure assets on an SoC network on chip by program instructions executing on the host CPU. For example, it may be used protect security-sensitive information, such as encryption keys, and security-related logic, such as a random number generator. The systems and methods described herein may isolate at least some security functions to a security engine co-processor that is separate from the host CPU. Under this approach, security attributes associated with the processor cores of the host CPU may be configured by boot code such that the processor cores cannot subsequently access the secure assets. Hardware on the CPU fabric may allow the boot code to lock down the values of the security attributes. Hardware on the CPU fabric may also determine if the boot code has correctly configured the security attributes associated with the processor cores of the host CPU. The hardware may provide a security confirmation signal to the security engine co-processor indicating whether or not this is the case. This approach may prevent program instructions executing on the host CPU from accessing secure assets that are to be accessed exclusively by the security engine co-processor. It may also prevent program instructions executing on the host CPU from changing the security attributes associated with its cores. For example, once the security attributes are locked down, program instructions executing on the security engine co-processor, rather than on the host CPU, may control any changes to the security attributes. Program instructions executing on the security engine co-processor may block certain accesses to the secure assets until the security status of the host CPU is verified.

System 1800 may include one or more processors, an SoC, an integrated circuit, or other mechanism. In at least some embodiments, system 1800 may include one or more processors 1810 communicatively coupled to a CPU fabric 1820, and a security engine co-processor 1840, including one or more other processors 1842. System 1800 may also include a memory network on chip 1850, over which memory requests 1836 are directed to on-chip memory, including DRAM 1852, SRAM 1854, and/or ROM 1856. System 1800 may also include an SoC network on chip 1845, over which program instructions executing on processors 1810 (on CPU fabric 1820), processors 1842 (on security engine co-processor 1840) and any other SoC masters 1830 access various memory devices 1860 and/or secure assets 1866 by issuing memory-mapped input/output (MMIO) requests 1834, 1833, and 1832, respectively.

In various embodiments, any of the processors 1810 on CPU fabric 1820 may be implemented fully or in part by the elements described in FIGS. 1-17. Although processor 1810 is shown in FIG. 18, any suitable mechanism may be used. For example, some or all of the functionality of processor 1810 may be implemented by circuitry, instructions for reconfiguring circuitry, a digital signal processor (DSP), a microcontroller, an application specific integrated circuit (ASIC), or a microprocessor having more, fewer, or different elements than those illustrated in FIG. 18 or in the preceding figures. In at least some embodiments, such mechanisms may be implemented in hardware. For example, in some embodiments, some or all of the elements of processor 1810 illustrated in FIG. 18 and/or described herein may be implemented fully or in part using hardware circuitry. In some embodiments, this circuitry may include static (fixed-function) logic devices that collectively implement some or all of the functionality of processor 1810. In other embodiments, this circuitry may include programmable logic devices, such as field programmable logic gates or arrays thereof, that collectively implement some or all of the functionality of processor 1810. In still other embodiments, this circuitry may include static, dynamic, and/or programmable memory devices that, when operating in conjunction with other hardware elements, implement some or all of the functionality of processor 1810. For example, processor 1810 may include a hardware memory having stored therein instructions which may be used to program system 1800 to perform one or more operations according to embodiments of the present disclosure. Embodiments of system 1800 and processor 1810 are not limited to any specific combination of hardware circuitry and software. Processor 1810 may include one or more processor cores 1815.

In at least some embodiments, CPU fabric 1820 may include a security mechanism 1822. Security mechanism 1822 may include, for each processor core 1815 of the processors 1810 on the CPU fabric, storage for respective values of one or more security attributes. In the example embodiment illustrated in FIG. 18, security mechanism 1822 includes storage for respective values of a boot mode indicator 1824, a security identifier value 1826, and a security identifier lock 1828 for each processor core 1815. In some embodiments, the storage for these security attributes may be implemented in local memory (RAM) on CPU fabric 1820. In various embodiments, the storage for these security attributes may include one or more registers or other data structures configured to store this information. For example, in one embodiment, each of multiple registers may store the respective values of a particular security attribute for all of the processor cores 1815. In another embodiment, each of multiple registers may store the values of all of the security attributes for a respective one of the processor cores 1815. In still other embodiments, each of multiple registers may store an individual security attribute for a single one of the processor cores 1815. In general, any configuration of registers, register bits, or other data structures may be used to store the security attributes, in different embodiments, as long as these security attributes are accessible individually or collectively (e.g., in aggregate) to security confirmation block 1825 and security engine co-processor 1840.

In at least some embodiments, the boot mode indicator 1824 for each processor core 1815 may be used to enable or disable boot mode. For example, upon powering up or following a reset type event, hardware circuitry within the CPU fabric may initialize each of the boot mode indicators to a value that enables boot mode. In one embodiment in which each of the boot mode indicators consists of a single bit, they may each be initialized to a value of 1'b1. In some embodiments, while in boot mode, the boot code executing on the host CPU may assign the values of the respective security IDs (shown as security ID values 1826) for each of the processor cores 1815, as described in more detail below. While in boot mode, MMIO requests sent from the host CPU to the SoC network on chip may be tagged with the highest security setting (i.e., the security setting representing the most privileged state). In one embodiment, the value representing the highest security setting may include multiple bits, all of which are zeros. This approach may allow access requests made by the boot code executing on the host CPU to secure assets 1866 to be issued. In some embodiments, while in boot mode, the boot code executing on the host CPU may configure security identifier requirements of the respective firewalls 1864 for the secure assets 1866. This mechanism is described in more detail below. In some embodiments, after initializing the security attributes of the processor cores 1815 and configuring the firewalls 1864 of the secure assets 1866, the boot code executing on the host CPU may disable boot mode on each of the processor cores. This may include writing to a specific Machine Status Register (MSR) in the CPU, causing CPU Microcode to clear the boot mode indicator(s) 1824 in the CPU Fabric. Subsequently, the respective security ID values for each processor core may be transferred with any MMIO requests made by the program instructions executing on the processor core that are directed to processing, memory, or logic blocks on the SoC network on chip 1845, including secure assets 1866. The boot mode indicator 1824 for each processor core 1815 may be implemented as a single bit or using multiple bits, in different embodiments.

In at least some embodiments, the respective security identifier values for each processor core 1815 (shown as security ID values 1826) may indicate a current security attribute of the processor core. For example, the capabilities of the processor core to access various secure assets 1866 may be dependent on its security ID value 1826. The security ID value 1826 for each processor core 1815 may include any number of bits that collectively encode a security attribute for the processor core. In general, this security attribute may affect which, if any, processing, memory, or logic blocks on the SoC network on chip 1845 (including secure assets 1866) the processor core is authorized to access. For example, this security attribute may be compared, by a firewall 1864, to a security ID requirement for a corresponding secure asset 1866 in order to determine whether or not a requested access to the secure asset is to be granted. In one embodiment in which two or more security levels are supported in the SoC architecture, the security ID value 1826 for each processor core 1815 may represent a security level that is assigned to the processor core. In such embodiments, the security ID value 1826 may or may not represent one of multiple numerically ordered (ranked) security levels. In an embodiment in which different virtual machines are authorized to access different assets or collections of assets, the security ID value 1826 for each processor core 1815 may represent an identifier of a virtual machine or a group of virtual machines that share a common security attribute. In an embodiment in which the processor cores can operate in two or more different security modes, the security ID value 1826 for each processor core 1815 may represent an identifier of a security mode in which the processor core is to operate or into which the processor core is placed.

In at least some embodiments, the respective security ID lock 1828 for each processor core 1815 may be used to lock down one or more security attributes of the processor core. The security ID lock 1828 for each processor core 1815 may include any number of bits that collectively encode a security ID lock state for the processor core. In some embodiments, a combination of the security ID value 1826 and the value of the security ID lock 1828 for a given processor core 1815 may define one of multiple security levels or lock states for the processor core. In other embodiments, various combinations of the boot mode indicator 1824, the security ID value 1826, and/or the value of the security ID lock 1828 for a given processor code may define different ones of multiple security modes. In some embodiments, once system software (e.g., boot code or other program instructions exciting on the host CPU) writes to one of the security ID locks 1828, the corresponding security ID value 1826 cannot be modified again by any software executing on the host CPU or by any of the other SoC masters 1830. In some embodiments, once system software (e.g., boot code or other program instructions exciting on the host CPU) writes to one of the security ID locks 1828, the corresponding security ID value 1826 cannot be modified again by any software executing on the host CPU or by any of the other SoC masters 1830 until the next power-up or reset event.

In some embodiments, boot code may set the security ID values 1826 for all of the processor cores to values other than the value representing the highest level of security, after which the boot code may set the security ID locks 1828 for all of the processor cores to a value that prevents the modification of security ID values 1826. For example, in an embodiment in which there are only two levels of security, the security ID value 1826 for each of the processor cores may be set to a value representing the lower (lowest) level of security. In embodiments in which there are more than two levels of security, the security ID values 1826 for each of the processor cores may be set to any value that does not correspond to the highest level of security. In either case, since the security ID values 1826 cannot be changed after they are locked down, this approach may allow the security engine co-processor to have exclusive access to secure assets on the SoC network on chip whose security ID requirements indicate that only masters configured for the highest level of security can access those secure assets. In some embodiments, once the host CPU has lost the capability to change the security ID values 1826 of its processor cores 1815 in this way, control over these trusted security attributes may effectively be migrated to the security engine co-processor 1840.

In some embodiments, the boot code to be executed by the host CPU in response to a power-up or reset event may be received from a third party (i.e., a party other than the developer of the majority of the components of system 1800) for integration with system 1800. For example, boot code 1862 shown in FIG. 18 may be signed and delivered by an original equipment manufacturer (OEM) on a memory device 1860 to be integrated on system 1800. In one embodiment, memory device 1860 may be an embedded multimedia card (eMMC). In other embodiments, other types of memory devices 1860 containing boot code 1862 may be integrated on system 1800. In some embodiments, prior to executing the boot code 1862, it may be transferred to memory that is accessible by the host CPU over the memory network on chip 1850. For example, a boot code image that was delivered as boot code 1862 on memory device 1860 may be copied to SRAM 1854, after which it may be executed out of SRAM 1854 by the host CPU.

In some embodiments, a boot code image, which is signed, may be checked to ensure that it has not been modified since it was received prior to transferring it to local memory. However, it may be possible for an OEM's signed boot code to incorrectly perform the actions required to transfer the secure attributes described herein from the host CPU to the security engine co-processor 1840. This may be done either intentionally or unintentionally. In at least some embodiments, additional hardware in the CPU fabric (shown as security confirmation block 1825) may be configured to confirm that all of the security settings for the processors 1815 have been set correctly by the boot code 1862. In at least some embodiments, security confirmation block 1825 may output a security confirmation signal 1846 to security engine co-processor 1840 indicating whether or not the host CPU has migrated the security attributes to the security engine co-processor. For example, in one embodiment, security confirmation signal 1846 may be asserted only if the respective boot mode indicator 1824 for each of the processor cores 1815 indicates that the processor core is no longer in boot mode, the respective security ID value 1826 for each of the processor cores 1815 indicates that the processor core is not at the highest level of security, and the respective security ID lock 1828 for each of the processor cores 1815 indicates that the host CPU can no longer change the value of its security ID value 1826. In various embodiments, security confirmation block 1825 may be may be implemented fully or in part using hardware circuitry. In some embodiments, this circuitry may include static (fixed-function) logic devices that collectively implement the functionality of security confirmation block 1825. In other embodiments, this circuitry may include programmable logic devices, such as field programmable logic gates or arrays thereof, that collectively implement the functionality of security confirmation block 1825. In still other embodiments, this circuitry may include static, dynamic, and/or programmable memory devices that, when operating in conjunction with other hardware elements, implement the functionality of security confirmation block 1825.

In some embodiments, upon powering up or following a reset type event, hardware circuitry within the CPU fabric may initialize each of the boot mode indicators to a value that enables boot mode. The host CPU may be booted from on-chip ROM 1856. After program instructions within the on-chip ROM cause the boot code image 1862 to be transferred to SRAM 1854, execution may jump to the boot code that was transferred to the SRAM. In some embodiments, when system 1800 is operating in boot mode, the host CPU (and its processor cores) may be operating at the highest level of security. In this case, the values of the security IDs 1826 for the processor cores may not affect the security-related capabilities of the host CPU. In this example, the security ID values 1826 may not affect the security-related capabilities of the host CPU until the host CPU has exited boot mode. In some embodiments, after exiting boot mode, the host CPU cannot re-enter boot mode.

In at least some embodiments of the present disclosure, security engine co-processor 1840 may include one or more processors 1842 and security engine firmware 1844. In some embodiments, security engine firmware 1844 may include program instructions stored in a local memory (e.g., a ROM) within security engine co-processor 1840. The program instructions within security engine firmware may, when executed by processors 1842, implement any of a variety of security functions, in different embodiments. In some embodiments, executing security software on security engine co-processor 1840, rather than on the host CPU, may reduce the risk of unauthorized or compromised accesses to secure assets 1866. In system 1800, by migrating the security attributes of the processor cores 1815 to security engine co-processor 1840, as described herein, security engine co-processor 1840 may have exclusive access to trusted security assets 1866 on SoC network on chip 1845.

In various embodiments, any of the processors 1842 of security engine co-processor 1840 may be implemented fully or in part by the elements described in FIGS. 1-17. Although processor 1842 is shown in FIG. 18, any suitable mechanism may be used. For example, some or all of the functionality of processor 1842 may be implemented by circuitry, instructions for reconfiguring circuitry, a digital signal processor (DSP), a microcontroller, an application specific integrated circuit (ASIC), or a microprocessor having more, fewer, or different elements than those illustrated in FIG. 18 or in the preceding figures. In at least some embodiments, such mechanisms may be implemented in hardware. For example, in some embodiments, some or all of the elements of processor 1842 illustrated in FIG. 18 and/or described herein may be implemented fully or in part using hardware circuitry. In some embodiments, this circuitry may include static (fixed-function) logic devices that collectively implement some or all of the functionality of processor 1842. In other embodiments, this circuitry may include programmable logic devices, such as field programmable logic gates or arrays thereof, that collectively implement some or all of the functionality of processor 1842. In still other embodiments, this circuitry may include static, dynamic, and/or programmable memory devices that, when operating in conjunction with other hardware elements, implement some or all of the functionality of processor 1842. For example, processor 1842 may include a hardware memory having stored therein instructions which may be used to program system 1800 to perform one or more operations according to embodiments of the present disclosure. Embodiments of processor 1842 are not limited to any specific combination of hardware circuitry and software. Processor 1842 may include one or more processor cores (not shown).

In at least some embodiments of the present disclosure, security engine firmware 1844 may include program instructions that, when executed by a processor 1842, test the security status of the host CPU before proceeding to access any of the secure assets 1866. In some embodiments, this may include determining whether or not the security confirmation signal 1846 that is provided by security confirmation block 1825 on CPU fabric 1820 is asserted. This determination may be made before accessing one of the secure assets 1866 (using an MMIO request 1833) or allowing a requested access to one of the secure assets 1866 by the host CPU (shown as MMIO request 1834) or by another SoC master 1830 (shown as MMIO request 1832) to be issued. If the security confirmation signal 1846 is asserted, this may indicate that the boot code 1862 has correctly configured and migrated the security attributes from the host CPU to the security engine co-processor 1840, and that the host CPU can no longer change these security attributes. In one embodiment, the secure assets 1866 may include a hardware random number generator that the security engine accesses to in order to perform various security-related functions, such as encryption key generation. In an embodiment in which only the security engine co-processor has the security credentials to generate or access encryption keys, for example, the encryption keys may never enter the software stack of the host CPU, which may add an additional layer of security to this security-sensitive information over existing security mechanisms. In other words, the techniques described herein may lock down the security attributes of the host CPU in a way in which the security engine can access the security-sensitive assets, but insecure (unsecured) logic on the host CPU cannot. This may prevent the operating system, for example, from being able to determine information about encryption keys or other security-sensitive assets that it should not have.

In some embodiments, while the security confirmation signal is not asserted, security engine co-processor 1840 may disallow accesses to secure assets 1866. For example, security engine co-processor 1840 may refuse to grant access to security-sensitive information, such as encryption keys, or to security-related logic, such as a random number generator. In other embodiments, if the security confirmation signal is not asserted following the execution of the initial program instructions in the on-chip boot ROM, security engine co-processor 1840 may prevent system 1800 from booting entirely, or may cause the execution of the boot code to be aborted without bringing up the system.

In some embodiments, the SoC network on chip 1845 may be a third party network on chip. For example, it may include hardware circuitry or logic to implement a communication subsystem between intellectual property cores of system 1800 and that is provided (or defined) by a party other than the developer of the majority of the components of system 1800 for integration with system 1800. In one embodiment, the SoC network on chip 1845 may span synchronous and asynchronous clock domains. In another embodiment, the SoC network on chip 1845 may include unclocked asynchronous logic. Requests to access secure assets 1866 (such as MMIO requests 1832, 1833, and/or 1834) may be directed to secure assets 1866 over SoC network on chip 1845.

In some embodiments, at least some of the secure assets 1866 may include, or be associated with, a respective firewall 1864 at the interface to the secure asset. In some embodiments, each of these firewalls 1864 may be configured to allow or disallow accesses to the corresponding secure asset 1866 based on the security ID value with which the access request is tagged. For example, in embodiments that support more than two possible security ID values, some processor cores 1815 may be authorized to access certain secure assets 1866, while other processor cores 1815 may not be authorized to access those same secure assets. However, in some embodiments, no accesses to the secure assets 1866 will be allowed if the security confirmation signal 1846 provided by security confirmation block 1825 to security engine co-processor 1840 is not asserted. For example, the security settings on each of the firewalls may be configured (e.g., by the boot code) to indicate a particular security ID requirement. This requirement may include a minimum allowable security ID value, a maximum allowable security ID value, an allowed range of security ID values, or a single allowed security ID value (e.g., for an exact match). An MMIO request 1834 that is directed to a secure asset 1866 may be tagged with the security ID value 1826 of the processor core 1815 that issued the request. If the security confirmation signal 1846 is not asserted, the security engine co-processor 1840 may not allow the request to be issued over the SoC network on chip 1845. If the security confirmation signal 1846 is asserted, the security engine co-processor 1840 may allow the request to be issued over the SoC network on chip 1845. In this case, the firewall 1864 for the targeted secure asset 1866 may determine whether the security ID value 1826 with which the MMIO request 1834 is tagged meets its security ID requirement setting. If so, the requested access may be granted. If not, the requested access may not be granted.

In another example, an MMIO request 1833 from security engine co-processor 1840 (or from a processor 1842 thereof) that is directed to a secure asset 1866 may be tagged with a security ID value indicating that the security engine co-processor 1840 has the highest possible security level (the highest possible privileges). If the security confirmation signal 1846 is asserted, the security engine co-processor 1840 may allow the request to be issued over the SoC network on chip 1845, and the firewall 1864 for the targeted secure asset 1866 may determine whether the security ID value with which the MMIO request 1833 is tagged meets its security ID requirement setting. If so, the requested access may be granted. If not, the requested access may not be granted. In some embodiments, at least some of the secure assets 1866 (e.g., those that are most security-sensitive) may only be accessed by the security engine co-processor 1840. In such embodiments, the security ID requirement setting for those secure assets may indicate that only access requests tagged with a security ID value representing the highest possible security level will be granted. In this case, because the security ID values 1826 of all of the processor cores 1815 have been set to a value that does not represent the highest possible security level, only the security engine co-processor 1840 will be able to access those secure assets.

In yet another example, an MMIO request 1832 from another SoC master 1830 that is directed to a secure asset 1866 may be tagged with a security ID value representing a security level other than the highest possible security level. If the security confirmation signal 1846 is asserted, the security engine co-processor 1840 may allow the request to be issued over the SoC network on chip 1845, and the firewall 1864 for the targeted secure asset 1866 may determine whether the security ID value with which the MMIO request 1832 is tagged meets its security ID requirement setting. If so, the requested access may be granted. If not, the requested access may not be granted. In at least some embodiments, none of the other SoC masters 1830 may be able to issue MMIO requests 1832 that are tagged with a security ID value representing the highest possible security level (the most privileged state).

In some embodiments, the system and methods described herein may allow early boot code to access secure assets. For example, in some embodiments, the configuration of the firewalls 1864 for the secure assets 1866 in system 1800 may only be done when the processor core 1815 on which the configuration code is executing is at the possible security level (with the highest possible privileges). In one embodiment, this may be done by keeping the boot mode indicator 1824 for that processor core set. In another embodiment, this may be done by clearing the boot mode indicator 1824 for that processor core and ensuring that the security ID value 1826 is set to a value representing the highest privilege level.

Unlike in some other existing SoC architectures, the security engine co-processor 1840 may be unable to access any internal state of the CPU Fabric (e.g., over IOSF-sideband or using peer-to-peer IOSF-primary accesses). However, the security confirmation block 1825, security confirmation signal 1846, and methods of security engine firmware 1844 described herein may provide the information necessary to allow security engine co-processor 1840 to assume responsibility for controlling accesses to secure assets 1866 based on the security attributes of the processor cores 1815 of the host CPU. In some embodiments, other methods within security engine firmware 1844 may be executed by one of processors 1842 to validate other SoC settings (e.g., the configurations of various firewalls 1864) by issuing accesses over the SoC network on chip 1845. In other words, in some embodiments, not only does the security engine firmware 1844 verify that the security attributes of the host CPU have been locked down, but also that the security state throughout the SoC has been configured correctly. In at least some embodiments of the present disclosure, the use of the security ID locks (and the method for determining that they have been set) may allow the security engine to be sure that the host CPU is in a mode in which it can no longer modify any of its security attributes. Therefore, if the security engine firmware subsequently reads the security settings of all the firewalls, it knows that there cannot be a race condition in which, after determining that they are correctly configured, the operating system or other program instructions executing on the host CPU can subsequently change them.

Figure 19:
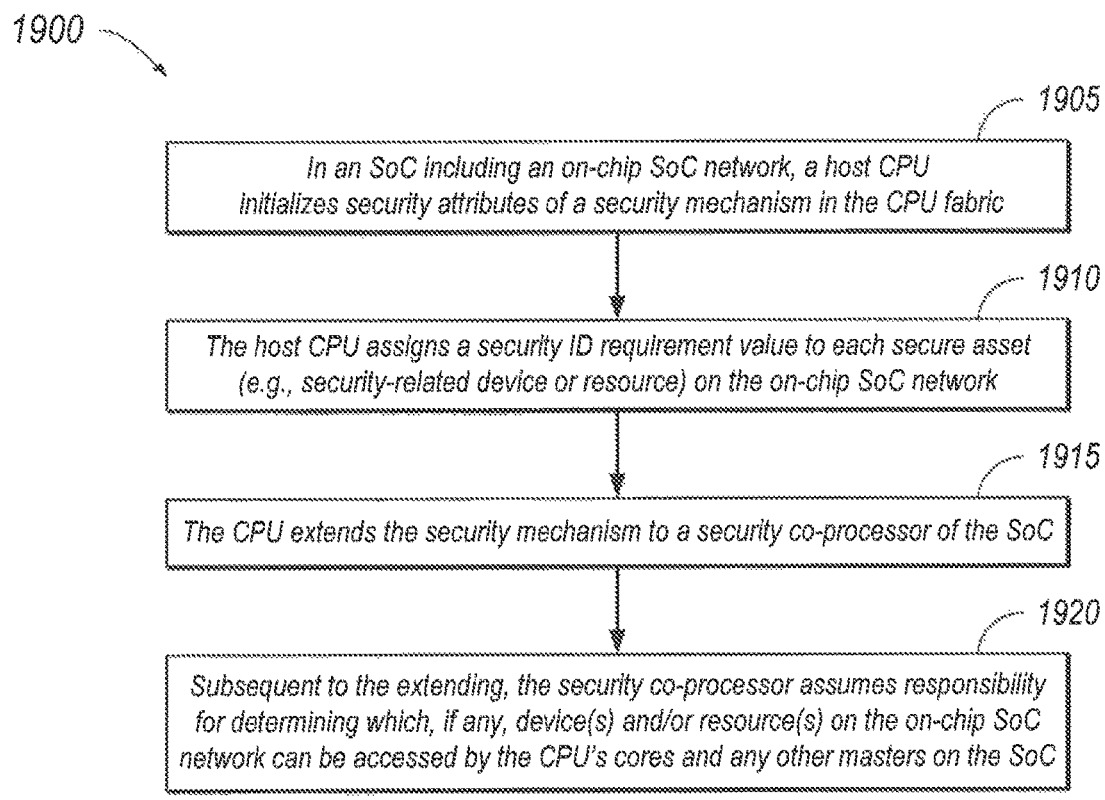
FIG. 19 illustrates an example method for migrating trusted security attributes from a host CPU to a security co-processor in an SoC architecture, according to at least some embodiments of the present disclosure.

FIG. 19 illustrates an example method 1900 for migrating trusted security attributes from a host CPU to a security co-processor in an SoC architecture, according to at least some embodiments of the present disclosure. Method 1900 may be implemented by any of the elements shown in FIGS. 1-18. Method 1900 may be initiated by any suitable criteria and may initiate operation at any suitable point. In one embodiment, method 1900 may initiate operation at 1905. Method 1900 may include greater or fewer steps than those illustrated. Moreover, method 1900 may execute its steps in an order different than those illustrated below. Method 1900 may terminate at any suitable step. Moreover, method 1900 may repeat operation at any suitable step. Method 1900 may perform any of its steps in parallel with other steps of method 1900, or in parallel with steps of other methods.

Furthermore, method 1900 may be executed multiple times to migrate trusted security attributes from a host CPU to a security co-processor. Method 1900 may be executed repeatedly, over time, to migrate trusted security attributes following power-on events. Method 1900 may be executed repeatedly, over time, to migrate trusted security attributes following reset type events. During the execution of method 1900, other methods may be invoked, such as methods 2000 and/or 2100 described below. These additional methods may be invoked to perform various elements of method 1900.

Figure 20:
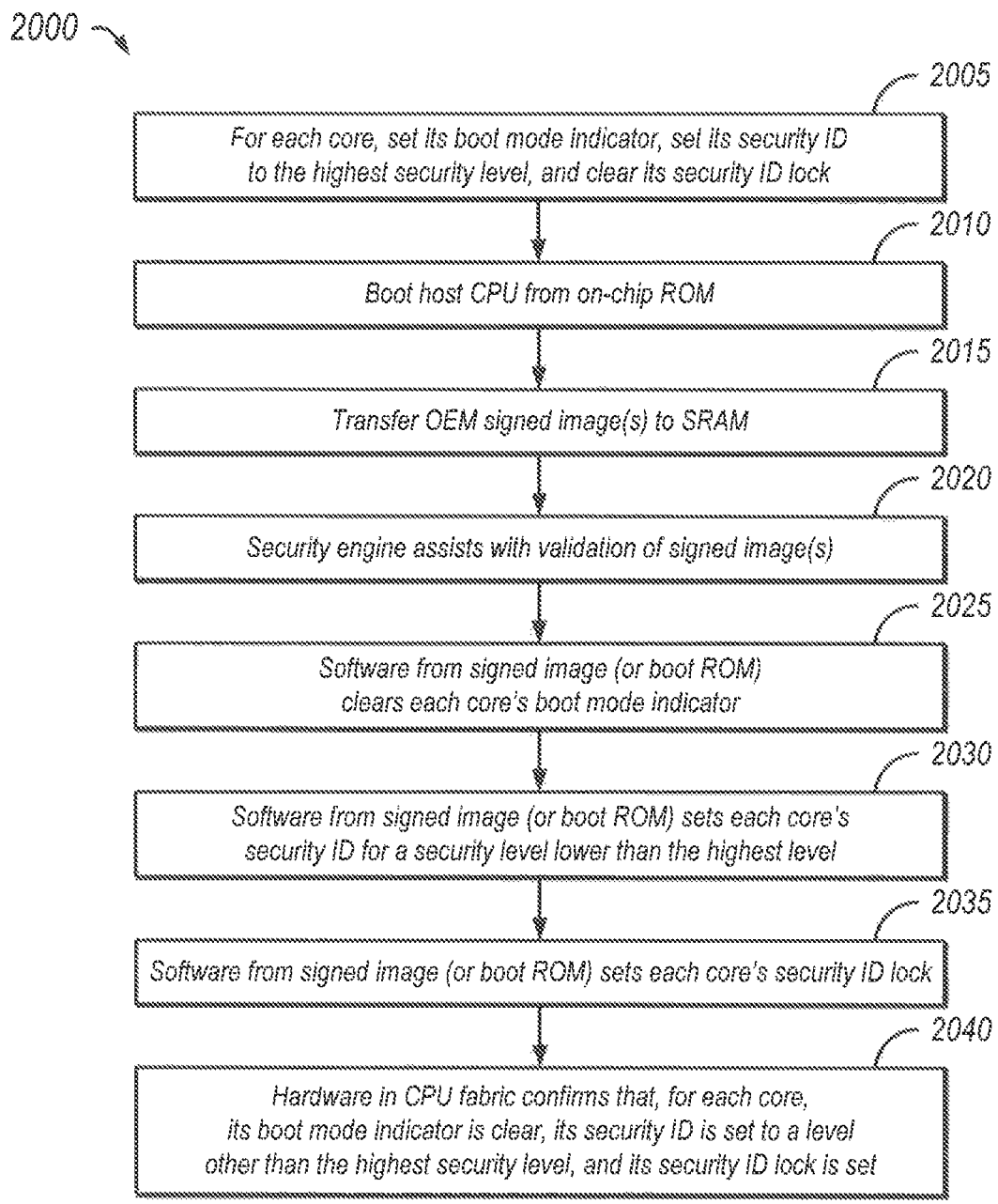
FIG. 20 illustrates an example method for initializing security attributes of the processor cores in an SoC architecture, according to at least some embodiments of the present disclosure.

At 1905, in one embodiment, a host CPU in an SoC that includes an on-chip SoC network may initialize one or more security attributes of a security mechanism in the CPU fabric. In some embodiments, the on-chip SoC network may be a third-party defined network-on-chip or a third-party supplied network-on-chip. The host CPU may include multiple processor cores in each of one or more processors. Initializing the security attributes may include executing boot code that causes particular values to be written to storage locations in the CPU fabric that are configured to store a respective boot mode indicator, security ID value and/or security ID lock for each processor core of the host CPU. One example embodiment of a method for initializing various security attributes of these processor cores is illustrated in FIG. 20 and described below. At 1910, the host CPU may assign a security ID requirement value to each secure asset (e.g., to each security-related device or resource) the on-chip SoC network. The secure assets may include, for example, a hardware random number generator or encryption keys to be accessed and used by the security co-processor in performing various security functions. In some embodiments, assigning the security ID requirement value may include configuring settings within a respective secure firewall interface included in, or associated with, each of the secure assets. In some embodiments, the configuration of these settings may be performed by executing, on a processor core operating at the highest security level (with the highest possible privilege) supported in the system, program instructions to write particular values to storage locations in the firewall interfaces that are configured to store the security ID requirement values. For example, the configuration may be performed while one of the processor cores has its boot mode indicator set. In another example, the configuration may be performed while the security ID value of a processor core whose boot mode indicator is not set is set to a value representing the highest privilege level.

At 1915, the host CPU may extend the security mechanism to a security co-processor of the SoC, as described herein. For example, extending the security mechanism to the security co-processor may include providing information from the host CPU to the security co-processor about the security level of the CPU (or of individual ones of its processor cores) to allow it to detect what resources the CPU (and/or each processor core) is authorized to access. In one embodiment, this may include a security confirmation block in the CPU fabric providing a security confirmation signal to the security co-processor, indicating the collective or aggregate security state of the host CPU, as described herein.

Figure 21A:
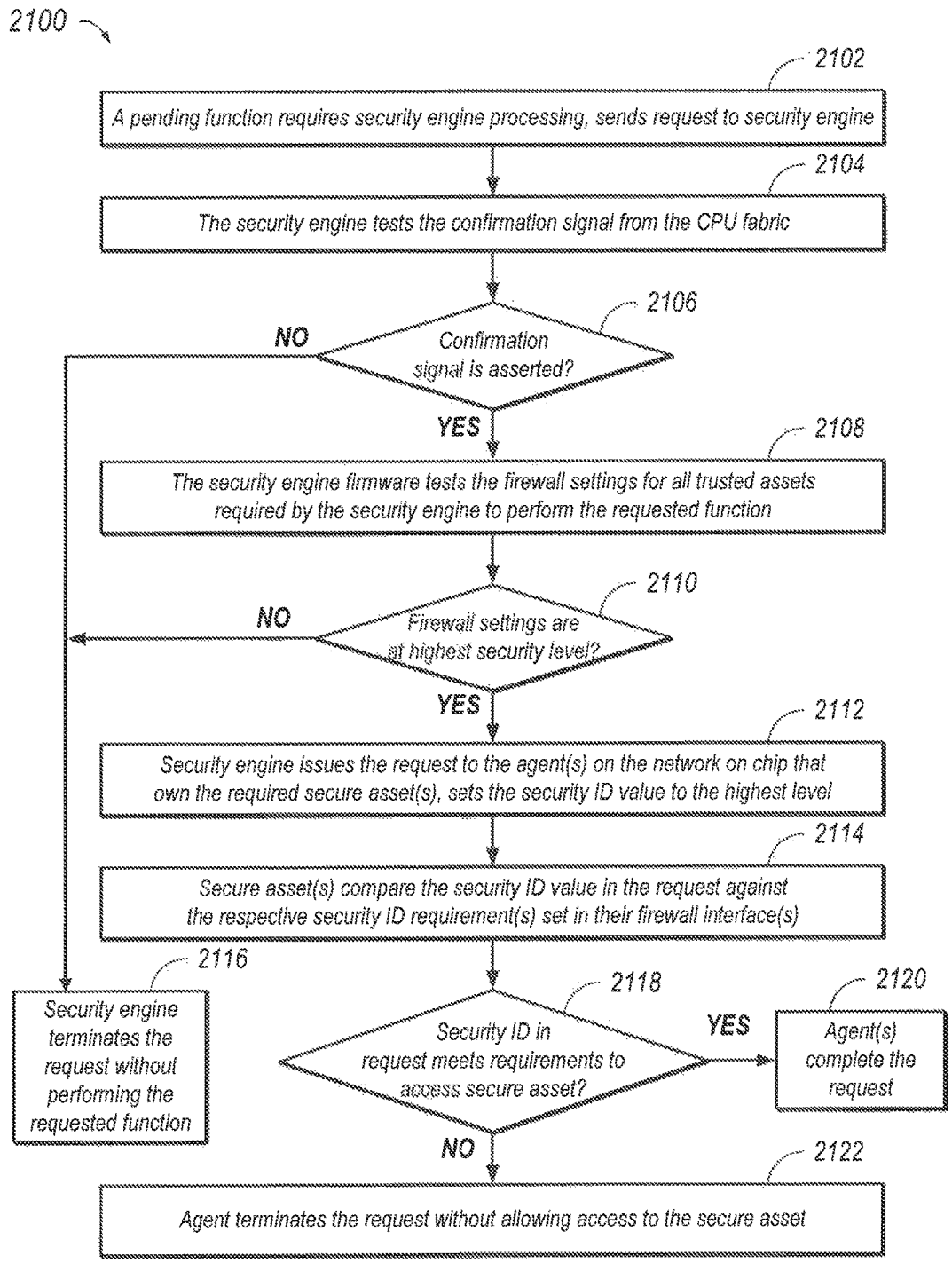
FIG. 21A illustrates an example method for determining whether a request for security engine processing is granted, according to at least some embodiments of the present disclosure.
Figure 21B:
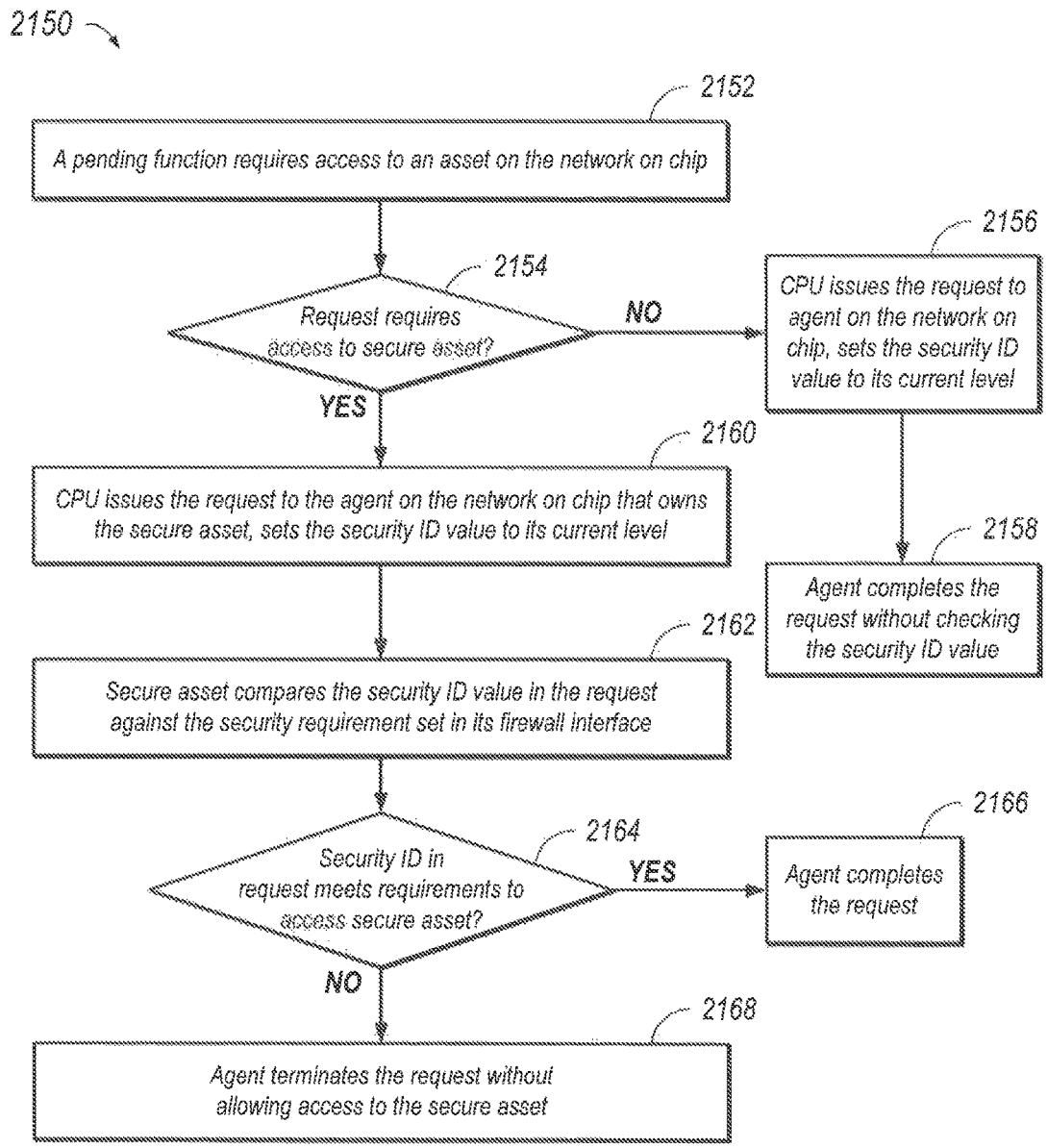
FIG. 21B illustrates an example method for determining whether accesses to assets on a network on chip, including secure assets, are allowed, according to at least some embodiments of the present disclosure.

At 1920, subsequent to the security mechanism being extended to the security co-processor, the security co-processor may assume responsibility for determining which, if any, device(s) and/or resource(s) on the on-chip SoC network can be accessed by the processor cores on the CPU fabric and/or by any other masters on the SoC. At this point, program instructions executing on processor cores of the host CPU may no longer be able to make changes to the security attributes, nor control which devices or resources can be accessed by the processor cores on the CPU fabric and/or by any other masters on the SoC. Example embodiments of methods for determining which device(s) and/or resource(s) can be accessed by the security co-processor, the processor cores on the CPU fabric, and/or by any other masters on the SoC are illustrated in FIGS. 21A and 21B and described below.

In some embodiments of the present disclosure, the firewall interfaces to secure assets on the on-chip SoC network may, following a power-on or reset event, allow any master in the system to access the secure assets. In such embodiments, boot code executing on the host CPU may, early in the boot process, configure the firewall settings to disallow access to the secure assets by at least some of the masters other than the security co-processor. In embodiments in which the system supports more than two possible security ID values, the boot code may set the security ID requirements of some secure assets to different values than the security ID requirements of other secure assets. For example, in embodiments in which multiple possible security ID values represent different security levels other than the highest supported security level, each of the secure assets may allow access by masters having a different respective security level. This may include some secure assets that only allow access by the security co-processor (at the highest security level). In embodiments in which multiple possible security ID values represent different masters or virtual machines, each of the secure assets may allow access by different masters. For example, one security ID value may represent the operating system, another security ID value may represent a modem, and a third security ID value (e.g., a security ID value that affords the highest possible privileges) may represent the security co-processor. In this example, the security ID requirements in the firewall interfaces for different secure assets may be configured so that only particular ones of these masters can access each of the secure assets. In some embodiments, these security ID requirements may not have any effect on incoming access requests until and unless the boot code has configured them in the firewall interfaces and has initialized and locked down the security attributes of the processor cores on the CPU fabric.

FIG. 20 illustrates an example method 2000 for initializing security attributes of the processor cores in an SoC architecture, according to at least some embodiments of the present disclosure. Method 2000 may be implemented by any of the elements shown in FIGS. 1-18. Method 2000 may be initiated by any suitable criteria and may initiate operation at any suitable point. In one embodiment, method 2000 may be invoked to perform one or more elements of method 1900 In one embodiment, method 2000 may initiate operation at 2005. Method 2000 may include greater or fewer steps than those illustrated. Moreover, method 2000 may execute its steps in an order different than those illustrated below. Method 2000 may terminate at any suitable step. Moreover, method 2000 may repeat operation at any suitable step. Method 2000 may perform any of its steps in parallel with other steps of method 2000, or in parallel with steps of other methods.

Furthermore, method 2000 may be executed multiple times to initialize security attributes of the processor cores in an SoC architecture. Method 2000 may be executed repeatedly, over time, to initialize security attributes of the processor cores following power-on events. Method 2000 may be executed repeatedly, over time, to initialize security attributes of the processor cores following reset type events. Following the execution of method 2000, other methods may be invoked, such as methods 2100 or 2150, described below. These additional methods may be invoked to perform one or more other elements of method 1900.

In some embodiments, method 2000 may be initiated in response to a power-on or reset event on the SoC. At 2005, in one embodiment, for each core on a CPU fabric in an SoC architecture, a respective boot mode indicator may be set, a respective security ID may be set to the highest security level, and a respective security ID lock may be cleared. At 2010, the host CPU may be booted from on-chip ROM. Since the on-chip ROM cannot be modified, this operation may be considered secure.

At 2015, one or more OEM signed images may be transferred to an SRAM that is accessible by the host CPU over an on-chip memory network. For example, the program instructions in the on-chip ROM may cause the OEM signed images to be copied to the SRAM. One such OEM image may include additional boot code to be executed by the host CPU while the host CPU is in boot mode. In one embodiment, an OEM signed image may be transferred to the SRAM from an eMMC provided by the OEM. In other embodiments, an OEM signed image may be transferred to the SRAM from another source, such as another type of memory device. At 2020, a security engine co-processor in the SoC architecture may assist with the validation of the OEM signed image(s). In at least some embodiments, this validation by the security engine co-processor may not require access to any trusted security assets.

At 2025, software that was transferred from the signed image (or boot code stored in a boot ROM) may be executed by the host CPU to clear the respective boot mode indicator for each processor core to exit boot mode and indicate that it is no longer booting. In some embodiments, this may include writing to a specific Machine Status Register (MSR) of the host CPU. At 2030, software that was transferred from the signed image (or boot code stored in a boot ROM) may be executed by the host CPU to set the respective security ID indicator for each core to a value representing a security level that is lower than the highest security level supported in the SoC. At 2035, software that was transferred from the signed image (or boot code stored in a boot ROM) may be executed by the host CPU to set the respective security ID lock for each core, thus preventing any subsequent modification of the corresponding security ID value.

At 2040, hardware in the CPU fabric may confirm that, for each core, the respective boot mode indicator is clear, the respective security ID indicator is set to a value representing a security level other than the highest security level supported in the SoC, and the respective security ID lock is set. In some embodiments, this confirmation may be performed by hardware circuitry or logic in a security confirmation block on the CPU fabric. In such embodiments, the security confirmation block may output a security confirmation signal to the security engine co-processor to indicate the security state of the host CPU. Subsequent to the security confirmation signal being asserted, only the security engine co-processor will be able to access any secure assets whose security ID requirements have been set to only allow accesses that are received from a master having the highest security level.

In one embodiment of method 2000 illustrated in FIG. 20, any of steps 2015 through 2035 may be executed in hardware as part of executing boot code in the signed image or the on-chip ROM or security firmware in the security engine co-processor.

FIG. 21A illustrates an example method 2100 for determining whether a request for security engine processing is granted, according to at least some embodiments of the present disclosure. Method 2100 may be implemented by any of the elements shown in FIGS. 1-18. Method 2100 may be initiated by any suitable criteria and may initiate operation at any suitable point. In one embodiment, method 2100 may be invoked to perform one or more elements of method 1900 In one embodiment, method 2100 may initiate operation at 2102. Method 2100 may include greater or fewer steps than those illustrated. Moreover, method 2100 may execute its steps in an order different than those illustrated below. Method 2100 may terminate at any suitable step. Moreover, method 2100 may repeat operation at any suitable step. Method 2100 may perform any of its steps in parallel with other steps of method 2100, or in parallel with steps of other methods.

Furthermore, method 2100 may be executed multiple times to determine whether an access to a secure asset is allowed. Method 2100 may be executed repeatedly, over time, to determine whether accesses to particular secure assets are allowed by particular masters at different points in time.

At 2102, in one embodiment, in response to detecting that a pending function requires security processing, a CPU may send a request to a security engine co-processor in an SoC architecture to perform a security function. At 2104, the security engine co-processor may test a security confirmation signal provided to the security engine co-processor by security confirmation logic on the CPU fabric. In this example, following the initialization of various security attributes in the system (as described herein), only the security engine co-processor is to be allowed to access particular secure assets used by the security engine co-processor in performing security-related functions. In some embodiments, if the security confirmation signal is asserted, this may indicate that, for all cores, the boot mode indicator is clear, the security ID is set to a value other than a value indicative of the highest security level, and the security ID lock indicator is set. At 2106, it may be determined whether or not the security confirmation signal is asserted.

If, at 2106, it is determined that the security confirmation signal provided by the security confirmation logic in the CPU fabric is not asserted, the method may proceed to 2116. At 2116, the security engine co-processor may terminate the request without performing the requested security function. If, at 2106, it is determined that the security confirmation signal provided by the security confirmation logic in the CPU fabric is asserted, the method may proceed to 2108.

At 2108, firmware executed by a processor on the security engine co-processor may test the firewall settings for all of the secure (trusted) assets that are required by the security engine in order to perform the requested security function. If, at 2110, it is determined that the firewall settings are not at the highest security level for these secure assets, the method may proceed to 2116. At 2116, the security engine co-processor may terminate the request without performing the requested security function. If, at 2110, it is determined that the firewall settings are at the highest security level for all of the secure (trusted) assets that are required by the security engine to perform the requested security function, the method may proceed to 2112. At 2112, the security engine co-processor may issue the request to the agent(s) on the network on chip that own the secure asset(s) required to perform the requested function, with the security ID value included in the request set to the highest security level.

At 2114, each of the secure asset(s) required to perform the requested function may compare the security ID value in the request against the respective security ID requirements set in each of their firewall interfaces. If, at 2118, it is determined that the security ID value included in the request meets the security ID requirements assigned to the targeted secure asset(s), the method may proceed to 2120. At 2120, the agent(s) may complete the request, and the requested security function may be performed. If, at 2118, it is determined that the security ID value included in the request does not meet the security ID requirements assigned to the targeted secure asset(s), the method may proceed to 2122. At 2122, the agent(s) may terminate the request without allowing access to the secure asset(s). In some embodiments, this may cause the security function to fail or to be aborted prior to completion.

In this example embodiment, method 2100 includes a multi-step process for determining whether accesses to various secure assets for the purposes of performing security functions are to be allowed. These requests may originate from program instructions executing on the host CPU, from firmware executing on the security engine co-processor, or from other masters in the system. For any given request, these steps may perform some or all of the following operations, as appropriate: verifying the correct initialization of security attributes of the host CPU, determining that the security ID requirements for secure assets to be used by the security engine co-processor when performing security-related functions have been assigned a value representing the highest possible security level, and/or determining that the request itself includes a security ID value that meets the security ID requirements for the targeted secure asset(s). The security ID requirement for each secure asset may include a minimum allowable security ID value, a maximum allowable security ID value, an allowed range of security ID values, or a single allowed security ID value (e.g., for an exact match), in different embodiments.

FIG. 21B illustrates an example method 2150 for determining whether accesses to assets on a network on chip, including secure assets, are allowed, according to at least some embodiments of the present disclosure. Method 2150 may be implemented by any of the elements shown in FIGS. 1-18. Method 2150 may be initiated by any suitable criteria and may initiate operation at any suitable point. In one embodiment, method 2150 may be invoked to perform one or more elements of method 1900 In one embodiment, method 2150 may initiate operation at 2152. Method 2150 may include greater or fewer steps than those illustrated. Moreover, method 2150 may execute its steps in an order different than those illustrated below. Method 2150 may terminate at any suitable step. Moreover, method 2150 may repeat operation at any suitable step. Method 2150 may perform any of its steps in parallel with other steps of method 2150, or in parallel with steps of other methods.

Furthermore, method 2150 may be executed multiple times to determine whether an access to various assets are allowed. Method 2150 may be executed repeatedly, over time, to determine whether accesses to particular assets are allowed by particular masters at different points in time.

At 2152, a pending function may require access to an asset on a network on chip in an SoC architecture. At 2154, it may be determined whether or not the request requires access to a secure asset on the network on chip. If, at 2154, it is determined that the request does not require access to a secure asset on the network on chip, the method may proceed to 2156. At 2156, the CPU may issue the access request to an agent on the network on chip, with the security ID value included in the access request set to the current security level of the CPU. Subsequently, at 2158, the agent may complete the access request without checking the security ID value of the request.

If, at 2154, it is determined that the request does require access to a secure asset on the network on chip, the method may proceed to 2160. At 2160, the CPU may issue the access request to an agent on the network on chip that own the targeted secure asset, with the security ID value included in the request set to the current security level of the CPU. Subsequently, at 2162, the targeted secure asset may compare the security ID value in the request against the security ID requirement set in its firewall interface. If, at 2164, it is determined that the security ID value included in the access request meets the security ID requirement assigned to the targeted secure asset, the method may proceed to 2166. At 2166, the agent may complete the access request. If, at 2164, it is determined that the security ID value included in the access request does not meet the security ID requirements assigned to the targeted secure asset, the method may proceed to 2168. At 2168, the agent may terminate the access request without allowing access to the targeted secure asset.

In this example embodiment, method 2150 includes a multi-step process for determining which accesses to various assets, including secure assets, are to be allowed. These accesses may be specified in access requests that originate from program instructions executing on the host CPU, or from other masters in the system. For any given access request, these steps may perform some or all of the following operations, as appropriate: verifying the correct initialization of security attributes of the host CPU, determining that the security ID requirements for secure assets have been assigned a value representing the highest possible security level, and/or determining that the access request itself includes a security ID value that meets the security ID requirements for the targeted asset. In at least some embodiments, method 2150 may be executed each time an access request that targets an asset on the network on chip is generated by one of the masters in the system. The security ID requirement for each secure asset may include a minimum allowable security ID value, a maximum allowable security ID value, an allowed range of security ID values, or a single allowed security ID value (e.g., for an exact match), in different embodiments.

In some embodiments of the present disclosure, the use of the security hardware and methods described herein may allow program instructions that perform security services to be run on the SoC (or more specifically, on the security engine co-processor) without the need to run a virtual machine monitor on the host CPU. In other words, by migrating security attributes from the host CPU to the security engine co-processor, the security engine co-processor may assume responsibility for controlling accesses to secure assets on the SoC network on chip regardless of whether or not program instructions executing on the host CPU are begin run within one or more virtual machines.

By providing information from the host CPU to the security co-processor about the security state of the host CPU, the security hardware and methods described herein may allow a security engine co-processor that is outside the CPU fabric of an SoC to determine what resources the host CPU is authorized to access, and to determine when and if the host CPU can no longer change what resources it has access to (e.g., by modifying its security attributes). The security engine co-processor may also be able to detect that the host CPU no longer has access to particular resources. The techniques described herein may also allow secure assets themselves to prevent at least some masters in the SoC to access those secure assets. In some embodiments, particular secure assets, such as those used by the security engine co-processor, may only grant access requests that originate on the security engine co-processor and that, thus, include a security ID value that represents the security level of the security engine co-processor.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Some embodiments of the present disclosure include a system. In at least some of these embodiments, the system may include a host CPU that includes a processor core, and the processor core may include circuitry to execute instructions. The system may also include a CPU fabric communicatively coupled to the processor core. The CPU fabric may include a first storage location to store a first security identifier value associated with the processor core. The system may also include a secure asset, and an on-chip network, communicatively coupled to the secure asset, through which requests that target the secure asset are to be directed to the secure asset. The system may also include a security engine outside of the CPU fabric and distinct from the processor core, that includes a processor to execute instructions, and circuitry to detect a request from the processor core for performance, by the security engine, of a security function that targets the secure asset, to determine, dependent on the first security identifier value associated with the processor core, whether or not access to the secure asset by the security function is authorized, to allow, responsive to a determination that access to the secure asset by the security function is authorized, the request to be issued over the on-chip network, and to prevent, responsive to a determination that access to the secure asset by the security function is not authorized, issuance of the request over the on-chip network. In combination with any of the above embodiments, the CPU fabric may further include a second storage location to store a security identifier lock value associated with the processor core, and a security confirmation block that includes circuitry to determine whether or not the first security identifier value represents a highest privilege state supported in the system, to determine whether or not the security identifier lock value indicates that the first security identifier value is modifiable, and to output, to the security engine, a security confirmation signal that when asserted indicates a determination that the first security identifier value represents a security state other than the highest privilege state supported in the system and that the security identifier lock value indicates that the first security identifier value is not modifiable. To determine whether or not access to the secure asset by the security function is authorized, the security engine may further include circuitry to receive the security confirmation signal from the security confirmation block, and to determine whether or not the security confirmation signal is asserted. In combination any of the above embodiments, the CPU fabric may further include a third storage location to store a value of a boot mode indicator associated with the processor core. When asserted, the security confirmation signal may further indicate that the value of the boot mode indicator indicates that the processor core is not in boot mode. In combination any of the above embodiments, the processor core may be a first one of a plurality of processor cores communicatively coupled to the CPU fabric, each of which is associated with a respective security identifier value, a respective security identifier lock value, and a respective boot mode indicator value. When asserted, the security confirmation signal may indicates that, for each of the plurality of processor cores, the respective security identifier value represents a security state other than the highest privilege state supported in the system, the respective security identifier lock value indicates that the respective security identifier value is not modifiable, and the respective boot mode indicator value indicates that the processor core is not in boot mode. In combination any of the above embodiments, the secure asset may be associated with a first security identifier requirement, and the secure asset may include circuitry to detect an access request received from the processor core over the on-chip network that targets the secure asset, where the access request includes an encoding of the first security identifier value, to determine, responsive to issuance of the access request over the on-chip network, whether or not the first security identifier value encoded in the access request meets the first security identifier requirement, to grant the access request, responsive to a determination that the first security identifier value encoded in the access request meets the first security identifier requirement, and to deny the access request, responsive to a determination that the first security identifier value encoded in the access request does not meet the first security identifier requirement. In combination any of the above embodiments, the security engine may be associated with a second security identifier value that represents a highest privilege state supported in the system, the secure asset may be associated with a first security identifier requirement that specifies that requests that target the secure asset are to be granted only when they include an encoding of the second security identifier, and the secure asset may include circuitry to receive the request from the security engine over the on-chip network, the request to include an encoding of the second security identifier value, to grant the request, responsive to a determination that the second security identifier value encoded in the request does not meet the first security identifier requirement. In combination any of the above embodiments, the system may further include a non-secure asset, where the non-secure asset is assigned a second security identifier requirement, and the second security identifier requirement assigned to the secure asset may allow access requests that target the non-secure asset and that include a security value representing a security state other than a highest privilege state supported in the SoC to be granted. The on-chip network may be communicatively coupled to the non-secure asset, and requests that target the non-secure asset may be directed to the non-secure asset over the on-chip network. The non-secure asset may include circuitry to detect an access request received from the processor core that targets the non-secure asset, where the access request includes an encoding of the first security identifier value, and the first security identifier value to represent a security state other than a highest privilege state supported in the SoC, to determine, in response to the issuing of the access request over the on-chip network, whether or not the first security identifier value encoded in the access request meets the second security identifier requirement, to grant the access request, in response to determining that the first security identifier value encoded in the access request meets the second security identifier requirement, and to deny the access request, in response to determining that the first security identifier value encoded in the access request does not meet the second security identifier requirement. In combination any of the above embodiments, the CPU fabric may further include a second storage location to store a security identifier lock value associated with the processor core, and the processor core may include circuitry to enter, responsive to a power-on or reset event, a boot mode, to execute, while in the boot mode, program instructions to write, to the first storage location, the first security identifier value, and to write, to the second storage location, a value to indicate that the value in the first storage location cannot be modified. The processor core may also include circuitry to exit the boot mode. In combination any of the above embodiments, the processor core may include circuitry to execute, while in the boot mode, program instructions to associate a respective security identifier value with each of a plurality of processor cores of the host CPU, including the processor core, to set a respective security identifier lock value for each of the plurality of processor cores to a value indicating that the host CPU is unable to modify the respective security identifier value associated with the processor core, and to set a respective boot mode indicator for each of the plurality of processor cores to a value indicating that the processor core is no longer in a boot mode. In combination any of the above embodiments, the CPU fabric may further include circuitry to boot the host CPU, and to validate a boot code image stored in a memory device on the SoC. The program instructions executed while in the boot mode may include program instructions contained in the boot code image. In combination any of the above embodiments, the secure asset may be associated with a first security identifier requirement, the secure asset may include a third storage location to store a value to represent the first security identifier requirement, and the processor core may further include circuitry to execute, while in the boot mode, program instructions to write the value to represent the first security identifier requirement to the third storage location. In combination any of the above embodiments, the processor core may further include circuitry to execute, while in the boot mode, program instructions to assign a respective security requirement to one or more secure assets on the on-chip network, including the secure asset. The security requirement may specify one or more security identifier values that, when encoded in a given access request targeting the secure asset, meet a condition required for granting the given access request. In combination any of the above embodiments, the first security identifier value may be one of a plurality of possible security identifier values in the system, each of which represents a particular security level among multiple security levels supported in the system, a particular virtual machine among multiple virtual machines implemented by the host CPU, or a particular security mode among multiple security modes supported in the system, and the secure asset may be associated with a first security identifier requirement that specifies one or more of the plurality of possible security identifier values as security identifier values that, when encoded in a request that targets the secure asset, meet a condition that is required in order to grant access to the secure asset.

Some embodiments of the present disclosure include a method. In at least some of these embodiments, the method may include initializing, by program instructions executing on a host CPU on a CPU fabric of an SoC, a security mechanism on the CPU fabric. The initializing may include storing respective values of one or more security attributes associated with a processor core of the host CPU, extending the security mechanism from the CPU fabric to a security co-processor on the SoC that is outside the CPU fabric and is distinct from the host CPU, detecting, by the security co-processor, a request from the processor core for performance, by the security co-processor, of a security function targeting a secure asset on an on-chip network of the SoC, and determining, by program instructions executing on the security co-processor, whether or not access to the secure asset by the security function is authorized, the determining being dependent on the respective values of the one or more security attributes associated with the processor core. In combination with any of the above embodiments, the method may further include preventing, in response to determining that access to the secure asset by the security function is not authorized, the issuing of the request over the on-chip network. In combination with any of the above embodiments, extending the security mechanism from the CPU fabric to the security co-processor may include providing, by the CPU fabric to the security co-processor, an indication of the security state of the host CPU, and determining whether or not access to the secure asset by the security function is authorized may include determining, dependent on the indication of the security state of the host CPU, whether or not the processor core is able to modify the respective values of the one or more security attributes associated with the processor core. In combination with any of the above embodiments, the one or more security attributes associated with the processor core may include a first security identifier value representing a security state other than a highest privilege state supported in the SoC, and the method may further include receiving, by a security interface of the secure asset from the processor core, a request to access the secure asset, the access request including an encoding of the first security identifier value, comparing, by the secure asset, the first security identifier value to a security requirement assigned to the secure asset, and granting, by the secure asset in response to determining that the first security identifier value meets the security requirement assigned to the secure asset, the request. In combination with any of the above embodiments, the security co-processor may be associated with a second security identifier value representing a highest privilege state supported in the SoC, a security requirement assigned to the secure asset may specify that access requests targeting the secure asset are granted only when they include an encoding of the second security identifier, and the method may further include issuing, by the security co-processor, on behalf of the security function, an access request targeting the secure asset, the access request including an encoding of the second security identifier value, and granting, by the secure asset, the access request. In combination with any of the above embodiments, the method may further include, prior to the initializing and in response to a power-on or reset event, booting the host CPU, and validating a boot code image stored in a memory device on the SoC. The initializing may include executing, on the host CPU, program instructions in the boot code image, including program instructions that cause the host CPU to perform associating a respective security identifier value with each of a plurality of processor cores of the host CPU, including the processor core, setting a respective security identifier lock value for each of the plurality of processor cores to a value indicating that the host CPU is unable to modify the respective security identifier value associated with the processor core, and setting a respective boot mode indicator for each of the plurality of processor cores to a value indicating that the processor core is no longer in a boot mode. In combination with any of the above embodiments, the method may further include executing, on the host CPU, additional program instructions in the boot code image, including program instructions that cause the host CPU to perform assigning a respective security requirement to one or more assets on the on-chip network, including the secure asset. The security requirement may specify one or more security identifier values that, when encoded in a given request targeting the asset, meet a condition required for granting the given request. In combination with any of the above embodiments, the first security identifier value may be one of a plurality of possible security identifier values supported in the SoC, each of which represents a particular security level among multiple security levels supported in the SoC, a particular virtual machine among multiple virtual machines implemented by the host CPU, or a particular security mode among multiple security modes supported in the SoC. In combination with any of the above embodiments, the processor core may be a first one of a plurality of processor cores communicatively coupled to the CPU fabric, each of which may be associated with a respective security identifier value, a respective security identifier lock value, and a respective boot mode indicator value, and the method may further include outputting, from a security confirmation block on the CPU fabric to the security co-processor, a security confirmation signal that when asserted indicates that, for each of the plurality of processor cores, the respective security identifier value represents a security state other than the highest privilege state supported in the system, the respective security identifier lock value indicates that the respective security identifier value is not modifiable, and the respective boot mode indicator value indicates that the processor core is not in boot mode.

Some embodiments of the present disclosure include a security co-processor. In at least some of these embodiments, the security co-processor may include a processor that includes circuitry to execute instructions, and circuitry to detect an access request that targets a secure asset on an on-chip network on the SoC on which the security co-processor resides, to determine whether or not a security mechanism on a host CPU on the SoC has been successfully initialized, to issue, responsive to a determination that the security mechanism on the host CPU on the SoC has been successfully initialized, the access request over the on-chip network, and to prevent, responsive to a determination that the security mechanism on the host CPU has not been successfully initialized, issuance of the access request over the on-chip network. In combination with any of the above embodiments, to determine whether or not the security mechanism on the host CPU on the SoC has been successfully initialized, the security co-processor may include circuitry to receive a security confirmation signal from security confirmation circuitry on the SoC, and to determine whether or not the security confirmation signal is asserted. When asserted, the security confirmation signal may indicate that the host CPU is in a security state in which its security attributes cannot be modified by the host CPU. In combination with any of the above embodiments, the security co-processor may further include circuitry to generate the access request during performance of a security function, the access request may include an encoding of a security identifier value associated with the security co-processor, and the security identifier value may meet a security requirement assigned to the secure asset that allows access requests that target the secure asset to be granted.

Some embodiments of the present disclosure include an apparatus. In at least some of these embodiments, the apparatus may include means for initializing, by program instructions executing on a host CPU on a CPU fabric of an SoC, a security mechanism on the CPU fabric. The means for initializing may include means for storing respective values of one or more security attributes associated with a processor core of the host CPU, means for extending the security mechanism from the CPU fabric to a security co-processor on the SoC that is outside the CPU fabric and is distinct from the host CPU, means for detecting, by the security co-processor, a request from the processor core for performance, by the security co-processor, of a security function targeting a secure asset on an on-chip network of the SoC, and means for determining, by program instructions executing on the security co-processor, whether or not access to the secure asset by the security function is authorized, the means for determining being dependent on the respective values of the one or more security attributes associated with the processor core. In combination with any of the above embodiments, the apparatus may further include means for preventing, in response to determining that access to the secure asset by the security function is not authorized, the issuing of the request over the on-chip network. In combination with any of the above embodiments, the means for extending the security mechanism from the CPU fabric to the security co-processor may include means for providing, by the CPU fabric to the security co-processor, an indication of the security state of the host CPU, and the means for determining whether or not access to the secure asset by the security function is authorized may include means for determining, dependent on the indication of the security state of the host CPU, whether or not the processor core is able to modify the respective values of the one or more security attributes associated with the processor core. In combination with any of the above embodiments, the one or more security attributes associated with the processor core may include a first security identifier value representing a security state other than a highest privilege state supported in the SoC, and the apparatus may further include means for receiving, by a security interface of the secure asset from the processor core, a request to access the secure asset, the access request including an encoding of the first security identifier value, means for comparing, by the secure asset, the first security identifier value to a security requirement assigned to the secure asset, and means for granting, by the secure asset in response to determining that the first security identifier value meets the security requirement assigned to the secure asset, the access request. In combination with any of the above embodiments, the security co-processor may be associated with a second security identifier value representing a highest privilege state supported in the SoC, a security requirement assigned to the secure asset may specify that access requests targeting the secure asset are granted only when they include an encoding of the second security identifier, and the apparatus may further include means for issuing, by the security co-processor, on behalf of the security function, an access request targeting the secure asset, the access request including an encoding of the second security identifier value, and means for granting, by the secure asset, the access request. In combination with any of the above embodiments, the apparatus may further include means for booting the host CPU and means for validating a boot code image stored in a memory device on the SoC prior to the initializing and in response to a power-on or reset event. The means for initializing may include means for executing, on the host CPU, program instructions in the boot code image, including program instructions that cause the host CPU to perform associating a respective security identifier value with each of a plurality of processor cores of the host CPU, including the processor core, means for setting a respective security identifier lock value for each of the plurality of processor cores to a value indicating that the host CPU is unable to modify the respective security identifier value associated with the processor core, and means for setting a respective boot mode indicator for each of the plurality of processor cores to a value indicating that the processor core is no longer in a boot mode. In combination with any of the above embodiments, the apparatus may further include means for executing, on the host CPU, additional program instructions in the boot code image, including program instructions that cause the host CPU to perform assigning a respective security requirement to one or more assets on the on-chip network, including the secure asset. The security requirement may specify one or more security identifier values that, when encoded in a given request targeting the asset, meet a condition required for granting the given request. In combination with any of the above embodiments, the first security identifier value may be one of a plurality of possible security identifier values supported in the SoC, each of which represents a particular security level among multiple security levels supported in the SoC, a particular virtual machine among multiple virtual machines implemented by the host CPU, or a particular security mode among multiple security modes supported in the SoC. In combination with any of the above embodiments, the processor core may be a first one of a plurality of processor cores communicatively coupled to the CPU fabric, each of which may be associated with a respective security identifier value, a respective security identifier lock value, and a respective boot mode indicator value, and the apparatus may further include means for outputting, from a security confirmation block on the CPU fabric to the security co-processor, a security confirmation signal that when asserted indicates that, for each of the plurality of processor cores, the respective security identifier value represents a security state other than the highest privilege state supported in the system, the respective security identifier lock value indicates that the respective security identifier value is not modifiable, and the respective boot mode indicator value indicates that the processor core is not in boot mode.

What is claimed is:

1. A system, comprising:
a host central processing unit (CPU) comprising a processor core, the processor core including circuitry to execute instructions;
a CPU fabric communicatively coupled to the processor core, the CPU fabric including a first storage location to store a first security identifier value associated with the processor core;
a secure asset;
an on-chip network, communicatively coupled to the secure asset, through which requests that target the secure asset are to be directed to the secure asset; and
a security engine separate from the host CPU, outside of the CPU fabric, and distinct from the processor core, including:
a processor to execute other instructions; and
circuitry to:
detect a request from the processor core for performance, by the security engine, of a security function that targets the secure asset, wherein the secure asset includes a security-related hardware and or security-related information;
determine, dependent on the first security identifier value associated with the processor core, whether or not access to the secure asset by the security function is authorized; and
allow, responsive to a determination that access to the secure asset by the security function is authorized, an access request to be issued over the on-chip network from the security engine to the secure asset,
wherein the CPU fabric further includes circuitry to output, to the security engine, a security confirmation signal that indicates a determination that the first security identifier value represents a highest privilege state supported in the system and that a security identifier lock value indicates that the first security identifier value is not modifiable.

2. The system of claim 1, wherein: the CPU fabric further includes a third storage location to store a value of a boot mode indicator associated with the processor core; and when asserted, the security confirmation signal further indicates that the value of the boot mode indicator indicates that the processor core is not in boot mode.

3. The system of claim 1, wherein: the processor core is a first one of a plurality of processor cores communicatively coupled to the CPU fabric, each of which is associated with a respective security identifier value, a respective security identifier lock value, and a respective boot mode indicator value; and when asserted, the security confirmation signal indicates that, for each of the plurality of processor cores: the respective security identifier value represents a security state other than the highest privilege state supported in the system; the respective security identifier lock value indicates that the respective security identifier value is not modifiable; and the respective boot mode indicator value indicates that the processor core is not in boot mode.

4. The system of claim 1, wherein: the secure asset is associated with a first security identifier requirement; and the secure asset comprises circuitry to: detect second access request received from the processor core over the on-chip network that targets the secure asset, the second access request to include an encoding of the first security identifier value; determine, responsive to issuance of the second access request over the on-chip network, whether or not the first security identifier value encoded in the second access request meets the first security identifier requirement; grant the second access request, responsive to a determination that the first security identifier value encoded in the second access request meets the first security identifier requirement; and deny the second access request, responsive to a determination that the first security identifier value encoded in the second access request does not meet the first security identifier requirement.

5. The system of claim 1, wherein: the security engine is associated with a second security identifier value that represents a highest privilege state supported in the system; the secure asset is associated with a first security identifier requirement that specifies that requests that target the secure asset are to be granted only when they include an encoding of the second security identifier; the secure asset comprises circuitry to: receive the access request from the security engine over the on-chip network, the access request to include an encoding of the second security identifier value; grant the access request, responsive to a determination that the second security identifier value encoded in the access request meets the first security identifier requirement.

6. The system of claim 1, wherein: the system further comprises a non-secure asset, the non-secure asset to be assigned a second security identifier requirement; the second security identifier requirement assigned to the secure asset allows access requests that target the non-secure asset and that include a security value to represent a security state other than a highest privilege state supported in the SoC to be granted; the on-chip network is communicatively coupled to the non-secure asset; requests that target the non-secure asset are to be directed to the non-secure asset over the on-chip network; and the non-secure asset comprises circuitry to: detect a third access request received from the processor core that targets the non-secure asset, the third access request to include an encoding of the first security identifier value, the first security identifier value to represent a security state other than a highest privilege state supported in the SoC; determine, responsive to issuance of the third access request over the on-chip network, whether or not the first security identifier value encoded in the third access request meets the second security identifier requirement; grant the third access request, responsive to a determination that the first security identifier value encoded in the third access request meets the second security identifier requirement; and deny the third access request, responsive to a determination that the first security identifier value encoded in the third access request does not meet the second security identifier req uirement.

7. The system of claim 1, wherein: the CPU fabric further includes a second storage location to store a security identifier lock value associated with the processor core; and the processor core comprises circuitry to: enter, responsive to a power-on or reset event, a boot mode; execute, while in the boot mode, program instructions to: write, to the first storage location, the first security identifier value; and write, to the second storage location, a value to indicate that the value in the first storage location cannot be modified; and exit the boot mode.

8. The system of claim 7, wherein: the secure asset is associated with a first security identifier requirement; the secure asset comprises a third storage location to store a value to represent the first security identifier requirement; and the processor core further comprises circuitry to execute, while in the boot mode, program instructions to write the value to represent the first security identifier requirement to the third storage location.

9. The system of claim 1, wherein: the first security identifier value is one of a plurality of possible security identifier values in the system, each of which represents a particular security level among multiple security levels supported in the system, a particular virtual machine among multiple virtual machines implemented by the host CPU, or a particular security mode among multiple security modes supported in the system; and the secure asset is associated with a first security identifier requirement that specifies one or more of the plurality of possible security identifier values as security identifier values that, when encoded in a request that targets the secure asset, meet a condition that is required in order to grant access to the secure asset.

10. A method, comprising:
   detecting, by a security engine separate from a host central processing unit (CPU) and outside of a CPU fabric communicatively coupled to a processor core of the host CPU, a request from the processor core for performance of a security function that targets a secure asset, wherein the secure asset is communicatively coupled to an on-chip network through which requests that target the secure asset are directed to the secure asset, and wherein the secure asset includes security-related hardware and security-related information;
   determining, dependent on a first security identifier value associated with the processor core, whether or not access to the secure asset by the security function is authorized, wherein the first security identifier value is stored in a first storage location of the CPU fabric;
   allowing, responsive to a determination that access to the secure asset by the security function is authorized, an access request to be issued over the on-chip network from the security engine to the secure asset; and
   outputting, from the CPU fabric to the security engine, a security confirmation signal that indicates a determination that the first security identifier value represents a highest privilege state supported in the system and that a security identifier lock value indicates that the first security identifier value is not modifiable.

11. The method of claim 10, wherein:
   the CPU fabric further includes a second storage location to store a value of a boot mode indicator associated with the processor core; and
   when asserted, the security confirmation signal further indicates that the value of the boot mode indicator indicates that the processor core is not in boot mode.

12. An apparatus, comprising:
   a host central processing unit (CPU) comprising a processor core, the processor core including circuitry to execute instructions;
   a CPU fabric communicatively coupled to the processor core, the CPU fabric including a first storage location to store a first security identifier value associated with the processor core;
   a secure asset;
   a system-on-chip network, communicatively coupled to the secure asset, through which requests that target the secure asset are to be directed to the secure asset; and
   a security engine separate from the host CPU, outside of the CPU fabric, and distinct from the processor core, including:
      a processor to execute other instructions; and
      circuitry to:
         detect a request from the processor core for performance, by the security engine, of a security function that targets the secure asset, wherein the secure asset includes security-related hardware and security-related information;
         determine, dependent on the first security identifier value associated with the processor core, whether or not access to the secure asset by the security function is authorized; and
         allow, responsive to a determination that access to the secure asset by the security function is authorized, an access request to be issued over the system-on-chip network from the security engine to the secure asset,
      wherein the CPU fabric further includes circuitry to output, to the security engine, a security confirmation signal that indicates a determination that the first security identifier value represents a highest privilege state supported in the system and that a security identifier lock value indicates that the first security identifier value is not modifiable.

13. The apparatus of claim 12, wherein:
the first security identifier value is one of a plurality of possible security identifier values in the system, each of which represents a particular security level among multiple security levels supported in the system, a particular virtual machine among multiple virtual machines implemented by the host CPU, or a particular security mode among multiple security modes supported in the system; and
the secure asset is associated with a first security identifier requirement that specifies one or more of the plurality of possible security identifier values as security identifier values that, when encoded in a request that targets the secure asset, meet a condition that is required in order to grant access to the secure asset.

* * * * *